(12) United States Patent
Baggs et al.

(10) Patent No.: US 11,686,095 B2
(45) Date of Patent: Jun. 27, 2023

(54) RFID-BASED MOISTURE-SENSING AND LEAK-DETECTION FOR ROOFING STRUCTURES AND METHODS OF USE

(71) Applicant: BuildTech Solutions LLC, Cheektowaga, NY (US)

(72) Inventors: George S. Baggs, Hamburg, NY (US); Aaron W. Golding, Jr., Derby, NY (US)

(73) Assignee: BuildTech Solutions LLC, Cheektowaga, NY (US)

( * ) Notice: Subject to any disclaimer, the term of this patent is extended or adjusted under 35 U.S.C. 154(b) by 163 days.

(21) Appl. No.: 17/212,049

(22) Filed: Mar. 25, 2021

(65) Prior Publication Data
US 2021/0301536 A1 Sep. 30, 2021

Related U.S. Application Data

(60) Provisional application No. 63/000,606, filed on Mar. 27, 2020.

(51) Int. Cl.
| | |
|---|---|
| *G01R 31/00* | (2006.01) |
| *E04D 13/00* | (2006.01) |
| *H04B 7/185* | (2006.01) |
| *G01M 3/16* | (2006.01) |
| *H04W 4/80* | (2018.01) |
| *B64C 39/02* | (2023.01) |

(52) U.S. Cl.
CPC .............. *E04D 13/006* (2013.01); *G01M 3/16* (2013.01); *H04B 7/18504* (2013.01); *H04W 4/80* (2018.02); *B64C 39/024* (2013.01)

(58) Field of Classification Search
USPC ........................................ 324/694, 718, 719
See application file for complete search history.

(56) References Cited

U.S. PATENT DOCUMENTS

| | | | |
|---|---|---|---|
| 5,648,724 | A | 7/1997 | Yankielun et al. |
| 7,768,412 | B2 | 8/2010 | Vokey |
| 9,157,828 | B2 | 10/2015 | Jaman et al. |
| 9,244,030 | B2 | 1/2016 | Vokey et al. |
| 9,341,540 | B2 | 5/2016 | Gunness |
| 9,695,593 | B2* | 7/2017 | Vokey .................. G01N 27/048 |
| 9,823,161 | B2 | 11/2017 | Gunness |

* cited by examiner

*Primary Examiner* — Vincent Q Nguyen
(74) *Attorney, Agent, or Firm* — Terrence M. Wyles, Esq.; Startup IP Law, LLC

(57) ABSTRACT

The inventive disclosures pertain to an improved roofing-protection system that features enhanced leak-detection and analytical capabilities. The improved system features RFID-enabled moisture-sensing elements contained in a moisture-sensing membrane, and can measure impedance changes across the moisture-sensing membrane. In some variations, the system is designed to detect and measure moisture leakage and roof loading by way of biplanar capacitance measurements. RFID tags for moisture sensors are read by drones or robots and wirelessly transmitted to the Cloud/Internet for remote data analytics.

29 Claims, 18 Drawing Sheets

111

111 YES

111 NO

118A 118B
minus 118C
equals

RFID-BASED MOISTURE-SENSING AND LEAK-DETECTION FOR ROOFING STRUCTURES AND METHODS OF USE

CROSS-REFERENCE TO RELATED APPLICATIONS

This patent application claims the priority benefit of U.S. Patent Application No. 63/000,606, filed on Mar. 27, 2020, for "RFID-Based Moisture-Sensing and Leak Detection for Building Structures and Methods of Use." In addition, this patent application hereby incorporates by reference U.S. Patent Application No. 63/000,606. For claim-construction purposes, if there are any irreconcilable differences between the disclosures in the present patent application and U.S. Patent Application No. 63/000,606, then the disclosures of the present patent application shall govern.

BACKGROUND

The primary goal of a building-envelope-protection system is to maintain the watertight integrity of the structure to prevent the entry of water. Any water that enters a building will damage the structure as well as the contents, and the presence of persistent moisture within a building will lead to the formation of toxic molds and fungi that can compromise the health and well-being of its inhabitants. Furthermore, water that enters a structure through the roof will be drawn downward by gravity throughout the structure's entire vertical space:

- Forty percent of all building-related problems are due to water intrusion (see Architect Magazine, Jun. 6, 2011, https://www.architectmagazine.com/technology/when-it-leaks-it-pours_o; last accessed on Mar. 8, 2021).
- Water usually intrudes through roofs, and roofs only make up about 2 percent of construction costs, but water intrusion accounts for more than 70 percent of construction litigation (see Architect Magazine, Jun. 6, 2011, https://www.architectmagazine.com/technology/when-it-leaks-it-pours_o).
- Other horizontal envelope protection systems such as deck and balcony coatings may be compromised by deficiencies introduced during installation.

Static moisture envelope-protection systems and passive methods of moisture monitoring such as finding visual evidence of leakage inherently carry risk, because any evidence of dampness or wetness within a structure almost always happens after the damage has been done.

To accomplish the goal of providing watertight integrity, commercial flat-roofing systems offer a variety of configurations. The leading class of commercial flat-roofing systems for both new-installation and reroofing projects are known as Single-Ply systems, which in 2016 comprised 62% of new roofing installations and 56% of reroofing installations (see 2015-2016 NRCA Market Survey http://www.nrca.net/2016-market-survey). Within the single-ply category, there are two primary membrane types: thermosets and thermoplastics. Thermoset membranes are made from rubber-polymer compounds, with the most common being ethylene propylene diene monomer rubber (EDPM). Thermoplastic membranes are made from polymers that soften when heated and harden when cooled. PVC (polyvinyl chloride), blends of PVC, TPO (thermoplastic polyolefins), and CPE (Chlorinated Polyethylene) represent the most common thermoplastic membrane materials. Other types of thermoplastic membrane are typically comprised of KEE (Ketone Ethylene Ester) or KEE alloyed with other thermoplastics. Single-ply membranes can also be strengthened against puncturing with an embedded layer of woven denier nylon fabric. Except for EDPM, all these aforementioned membrane materials are electrically insulative; while EDPM is slightly conductive (~1E10-7 ohms/square) due to the carbon that is added to the EDPM material to enhance resistance against the sun's UV (ultraviolet) radiation. Some examples of commercially available, single-ply, roofing-membrane systems include the Tremco® TremPly® TPA (Tri-Polymer Alloy), TPO, and KEE product lines. In Tremco® single-ply systems, roofing membranes typically have a width dimension of 78 inches to 120 inches and range in thickness from 44 to 80 mils. Carlisle's product line of single-ply roofing systems includes the Sure-Seal™ and Sure-Tough™ EDPM product lines, the Sure-Weld™ TPO product line, Sure-Plex™ PVC product line, and/or KEE. Single-ply membranes from various manufacturers are typically mechanically fastened to the substrate or adhesively adhered to the substrate via a fleece-backing on the substrate-side of the membrane. In addition to mechanical and adhesive means, EDPM membranes can also be secured in-place with a ballast overburden.

To overcome the inherent problems associated with passive leak-detection methods, and because of the high risk of and costs from roof leakage, electrical or electronic leak-detection (ELD) methods and systems have been developed for commercial roofing. Almost all of the commercially-available ELD methods and systems rely on applying an electric potential (voltage) to the outer (upper) surface of a roofing membrane, and then detecting the presence of a leak in the membrane, either by sensing the effects on the applied voltage electric field to infer the presence of electrical current flowing through the membrane breach, or by directly measuring the electrical current caused by the membrane breach using an array of sensors placed under the membrane. The location of the leak can be determined by either measuring the gradient of the electric potential on the upper surface of the membrane (i.e., mapping the vector of the change in the electric potential) or by selectively switching the electrical return path of the sensors under the membrane. All these techniques rely on the presence of water above the membrane to detect the presence and location of a membrane breach.

Several variations of ELD methods exist in the commercial roofing market, and these can be segregated into two distinct categories: low-voltage methods and high-voltage methods. The ELD described in the paragraph above is a low-voltage method, where the voltages that are applied across the roofing membrane are typically less than 40 volts DC and the roof surface must be wet for leak-detection measurements to be effective. Conversely, the high-voltage method requires a dry roof surface and relies on the application of thousands or even tens-of-thousands of volts DC across the membrane to create a spark to ground through a membrane defect. The primary advantage of the high-voltage method is the capability to measure membrane penetrations on sloped and vertical surfaces, because there is no need to keep water on the surface being tested. It should be noted that in both these methods, the term "across" refers to the displacement distance between the upper and lower surfaces of a roofing membrane.

There are several different systems and methods of low-voltage ELD commercially available. Electrical-Field Vector Mapping (EFVM) is performed initially after installation of the roof, or periodically for maintenance as required by warranty terms, or to locate a leak in an existing roof. The measurements are primarily performed as a quality-control method for initial roofing installation-verification, but also as a forensic technique to isolate the location of a leak that occurs in an existing roof. EFVM first appeared in the early 1970s and uses a loop of perimeter cable or trace wire placed over the membrane surface that has been energized with a low-voltage potential (typically 30 Vdc). The roof surface is wetted, and a technician then uses two sets of probes to 'map' the differential voltage between the two probes within the area created by the perimeter cable loop. The method relies on using a conductive return path below the membrane to reference all common-mode voltage measurements (i.e., the voltage measured by each individual probe). Any water leakage through the membrane will setup an electric current flow between the perimeter cable or wire loop and the membrane penetration, and this electric current flow will distort the electric field within the area bounded by the perimeter cable loop; the technician then follows the vector gradient of the voltage distortion to locate the membrane penetration. The technique only samples discrete spots within the perimeter wire loop area and requires a good electrical return path beneath the membrane for the leakage current to flow properly. EFVM relies heavily on the technician's skill to determine how many measurement samples are adequate to detect and then locate a leak, and to also to screen out false positives from electrically-conductive roof penetrations such as pipes, vents, and lightning-protection conductors, which sometimes requires the proper placement of additional guard cables to eliminate the false positives. This limitation also prevents EFVM from measuring leakage around electrically-conductive-membrane penetrations. Traditional EFVM will not work correctly on uncoated EDPM roofing because of the partially-conductive nature of the membrane material. EFVM also has limited ability to perform the leak-detection through multiple layers of roofing and cannot be used to leak-test an overburdened membrane. A system called IntegriScan™ by Detec Systems overcomes some of the limitations of EFVM by using an apparatus (similar in size and shape to a lawn mower) that the technician pushes across the roof surface, which automatically finds leaks using the principals of EFVM within the membrane-contact perimeter of the IntegriScan™ apparatus (see U.S. Pat. No. 9,244,030 to Vokey et al. for "Method of detecting a leak in a membrane of a roof"). ASTM Standard D78777 provides guidelines for ELD testing on conventional or electrically-insulated membranes. In all cases of EFVM use, an electrically-conductive roofing substrate such as metal and to a lesser extent concrete, is required to complete the electrical return path. EFVM applications to non-conductive substrates such as wood or thermal insulation require the addition of an electrically-conductive layer above the substrate.

To minimize recurring EFVM labor, sometimes the perimeter and guard cables are permanently installed within a roofing system, such that measurements can quickly be made by a technician when needed—this type of EFVM is known as an "on-demand system." The main problem with this method of leak-detection is that it only provides the indication that a leak is either present or not present at the time the measurement is made. A poorly-installed roof that is not leaking when first tested may begin leaking a few weeks after installation, or a well-installed roof may begin leaking years later, after the roof has been exposed to UV radiation and many hot and cold thermal cycles. If the latter case occurs, then often the structure will have suffered damage before moisture is noticed within the building. Often, the lower membrane in a roofing system, such as the polymer or bitumen vapor-barrier membrane will hold back water leakage long after the upper membrane in a roofing installation has failed, and because of this, the materials (insulation and cover boards) between the two membranes will have potentially suffered years of high humidity, moisture degradation, and toxic mold growth before water intrusion into the building interior occurs. An example of a commercially-available on-demand EFVM leak detection system is Gaussan™ LV from Gaussan Technologies.

To overcome the periodic nature of EFVM measurements, on-demand systems have been enhanced with permanently-installed electronic measurement devices to provide continuous monitoring of a roofing systems installation. These systems use an electrical system external to the roofing installation to excite the various wire loops and cables with low voltages, and to switch between a grid of potential-gradient-sensing wires that are permanently placed above the roofing membrane (see U.S. Pat. No. 9,695,593 to Vokey et al. for "Leak detection in roof membranes" and U.S. Pat. No. 9,157,828 to Jaman et al. for "Method and apparatus for differential voltage grid-based moisture monitoring of structures"), or in other systems, to switch between an array of sensors installed below the membrane in the return-current path (see U.S. Pat. No. 9,341,540 to Gunness for "Leak detection and location system, method, and software product" and U.S. Pat. No. 9,823,161 to Gunness for "Leak detection and location system and method"). These continuously-monitored low-voltage ELD systems can be installed in layered systems with an upper and lower membrane, or in built-up-roofing (BUR) systems, or on inverted-roof-membrane-assemblies (IRMA) systems that are covered with an overburden. Some on-demand systems are enhanced with discrete sensors that measure humidity, moisture, and temperature. To excite the various wire loops and cables, and to address the various sensing elements, these types of systems require computerized supervisory control and data-acquisition (SCADA) that is permanently installed within the structure being monitored, and during the installation of the roofing system, the SCADA must be physically wired to the excitation cables and array of sensing-wire elements and discrete sensors, or wirelessly interfaced with the discrete sensors. The SCADA computer may be remotely accessed over the Internet to check measurement records, or the SCADA computer may continuously upload measurement data and summary reports to the Internet or cloud storage. However, because of the complexity and expense of a continuously-monitored on-demand low-voltage ELD, a system such as this is normally installed on so-called high-value structures such as hospitals, government facilities, or other buildings where the added expense is considered cost-effective, or when the building owner can afford and is willing to incur the added costs. Commercial examples of these systems include PermaScan™ by Detec Systems for use on IRMAs, Gaussan™ DST and VST from Gaussan Technologies, and Smartex® from Progeo and International Leak Detection for use on IRMAs and layered insulated roofs.

BRIEF SUMMARY

The present inventive disclosures are directed to the integration of a moisture-sensing apparatus into a roofing membrane that uses self-powered, passive-wireless RFID technology to both detect leakage and locate the area of the membrane defect. The moisture-sensing elements may be similar to a configuration revealed by U.S. Pat. No. 5,648,724 to Yankielun et al. ("Yankielun") for "Metallic time-domain reflectometry roof moisture sensor," which prescribes that a transmission-line sensor be embedded within a medium having a dielectric constant that changes in the presence of water. In addition to discrete moisture-sensing elements, the Yankielun configuration has been adapted for integration within an envelope system to provide stand-alone, intrinsic-moisture-sensing capability as described in the present inventive disclosures herein.

In many embodiments, the data measured is transmitted to a cloud-based application that performs predictive analytics. The improved leak-detection system for roofing and other above-grade membranes provides the following advantages:

- Integrating the sensing apparatus with the roofing membrane system provides the roofing installation with intrinsic leak-detection capability, thereby eliminating the need for installing external excitation cables, sensing wire elements, and discrete sensors; and
- Exploiting the inherent capabilities of low-cost and miniaturized RFID technology eliminates the need for complex apparatuses and methods to sense and then locate the area of leakage; and
- Moving the computational process to a cloud-based application eliminates the need to install and connect a complex computerized SCADA system in every building with a continuously-monitored on-demand leak detection system installed; and
- The improved system can be used with both flat and pitched roofing systems, including single-ply systems and partially-conductive EDPM membranes, within the non-bitumen or non-asphaltic layers of built-up systems, metal roofs, and IRMA roofs with overburdens; and
- The simplified and reduced-cost system allows every owner to afford the installation of a continuously or semi-continuously monitored leak-detection system on their building.

In addition, the inventive disclosures contained herein are designed to address the limitations in ELD used in the above-identified existing art, and primarily focus upon improvements to roofing systems with the addition of discrete moisture sensors or integrated moisture-sensing channels, thereby providing state-of-the-art single-ply roofing membranes with intrinsic leak-detection capability. The improved roofing membrane may be used as a separate component within a roofing system or may be factory-integrated with other roofing components. Although targeted for single-ply roofing installations, the improved roofing membrane can also be useful within layered roofing installations such as BUR systems and other horizontal applications such as decks and balconies.

The improved moisture-sensing roofing membrane can be layered below a single-ply roofing membrane or at multiple levels within a layered roofing system, or on the non-bitumen or non-asphaltic layers of a BUR system. The improved moisture sensing roofing membrane may have a water-permeable hydrophilic wicking layer or component that may draw in any water leaking through the outer roofing membrane or that is present within the roofing system, and use a capacitance change to detect the presence of moisture.

In an embodiment, the capacitive-sensing device can be a continuous metalized plane on the surface of the wicking layer closest (proximal surface) to the structural substrate and a plurality of metalized planar areas on the surface of the wicking layer furthest (distal surface) from the structural substrate. The dielectric material between the metalized planes is formed by the wicking layer. The capacitance of this device is then used to sense the presence of moisture. In variations, the stack of layers can be bonded together through friction-welding or adhesive processes.

In other embodiments, a plurality of passive UHF RFID tags are used to excite the capacitive-sensing devices within the moisture-sensing membrane. In one embodiment, each RFID tag can be connected to a flat set of conductive traces and electrically-bonded to a capacitive-sensing device. In variations, each RFID tag is electrically-bonded directly to a capacitive-sensing device within the moisture-sensing membrane.

In yet another embodiment, a plurality of discrete passive UHF RFID tags based on resistive/inductive/capacitive (RLC) impedance of the RFID sensor antenna is integrated within the moisture-sensing membrane. Tags based on RLC impedance make use of specially-designed RFID-sensor chips or simply use standard retail RFID chips that are adapted to the dielectric constant of the material that they are installed into. These RLC impedance-based sensor tags do not require direct contact with water to sense the presence of moisture below the membrane. Because of the sensitivity of RLC impedance-based RFID sensor tags to the materials that they are installed into, a baseline calibration is needed to calibrate the dry condition of the sensor tags.

In all cases, the RFID tags provide the data needed to determine if leakage is occurring within a roofing or decking installation, and the unique digital code associated with each RFID tag allows the location of the leak to be determined. This information can be wirelessly transferred to and from an RFID reader, and in some embodiments, the data is uploaded directly to a cloud-based application, while in other embodiments, the data is sent to the Internet via a wireless router and then on to the cloud-based application. The cloud-based application has the capability to display data trends and to perform predictive-analytics using applied statistics and machine-learning-based AI (Artificial Intelligence).

BRIEF DESCRIPTIONS OF THE DRAWINGS

Figure 2A:
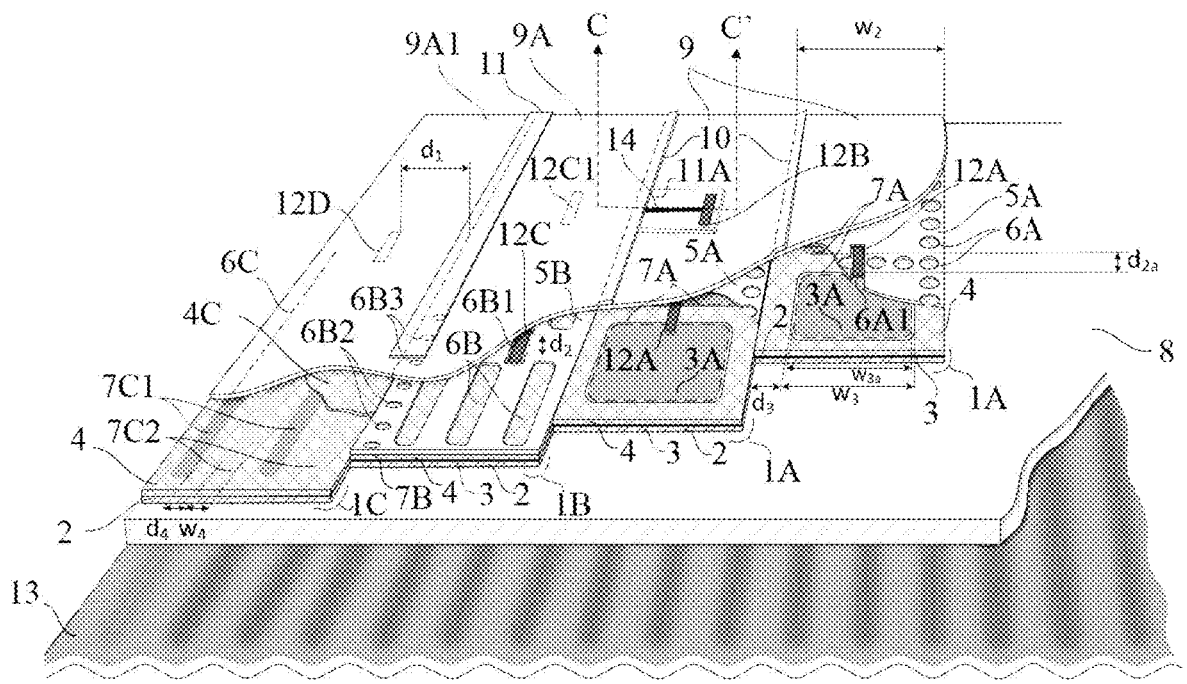
FIG. 2A depicts a single-ply roofing installation with other embodiments of the improved composite moisture-sensing membrane. A detail fragment of FIG. 2A is also provided in FIG. 2A-1.
Figures 1, 2A:
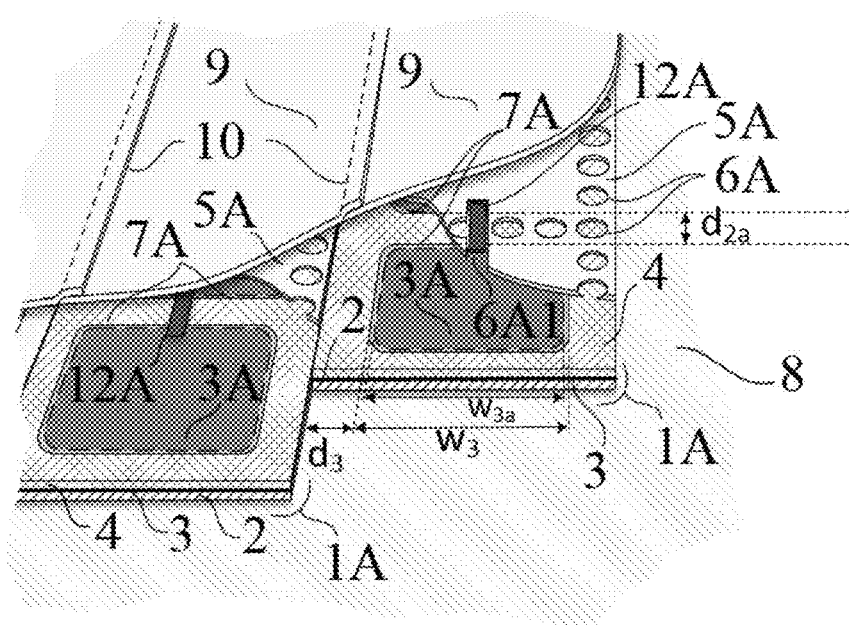
Figure 2B:
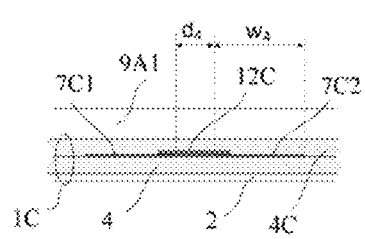
Figure 2C:
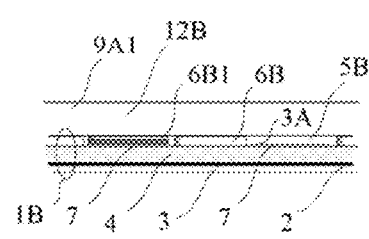
Figure 2D:
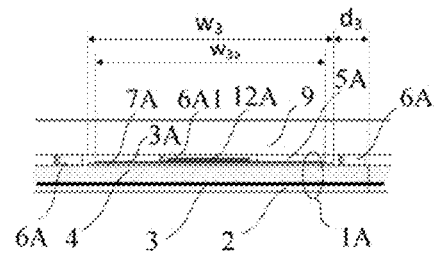

FIGS. 2B, 2C, and 2D each depict cross-sectional views of several of the other embodiments of the improved composite moisture-sensing membranes depicted in FIG. 2A.

Figure 2E:
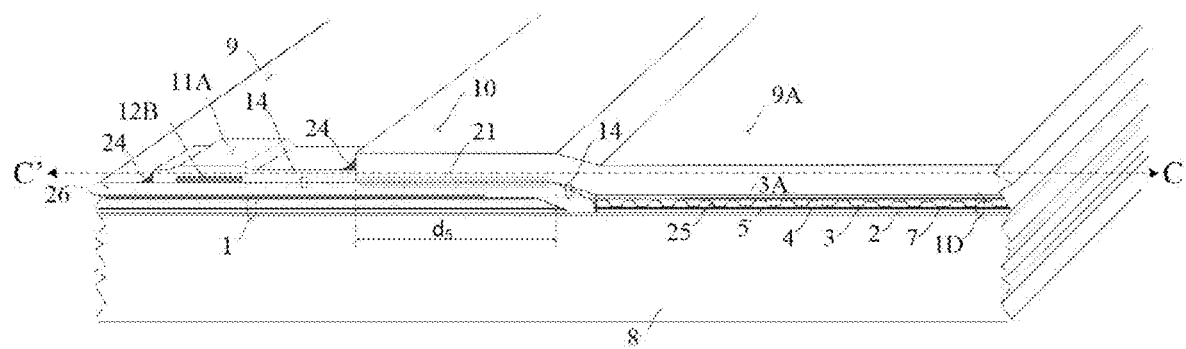

FIG. 2E depicts an isometric cross-sectional view of Detail CC' of FIG. 2A that shows one example of how roofing membranes can be overlapped with the improved moisture-sensing membrane below the roofing membranes.

Figure 2F:
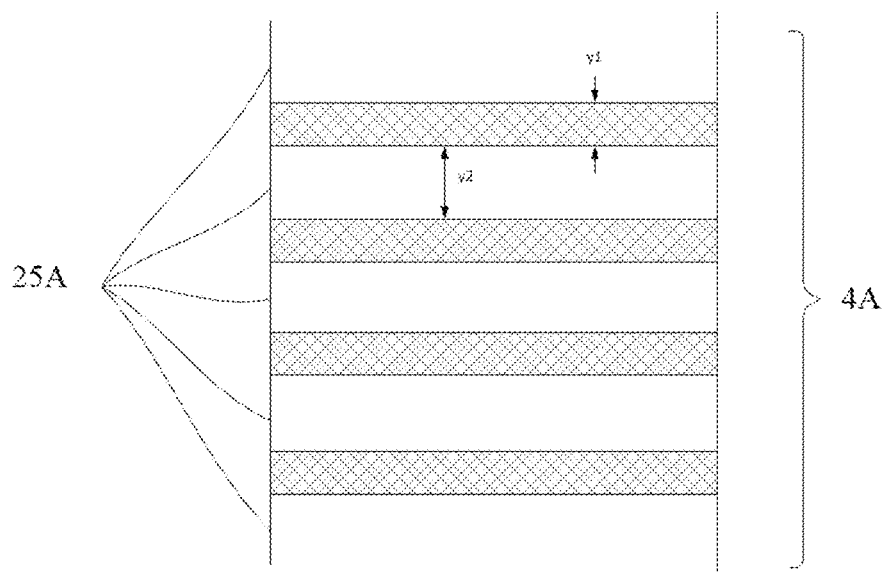

FIG. 2F depicts a notional representation of a wicking layer with reinforcing scaffolding on an improved moisture-sensing membrane.

Figure 2G:
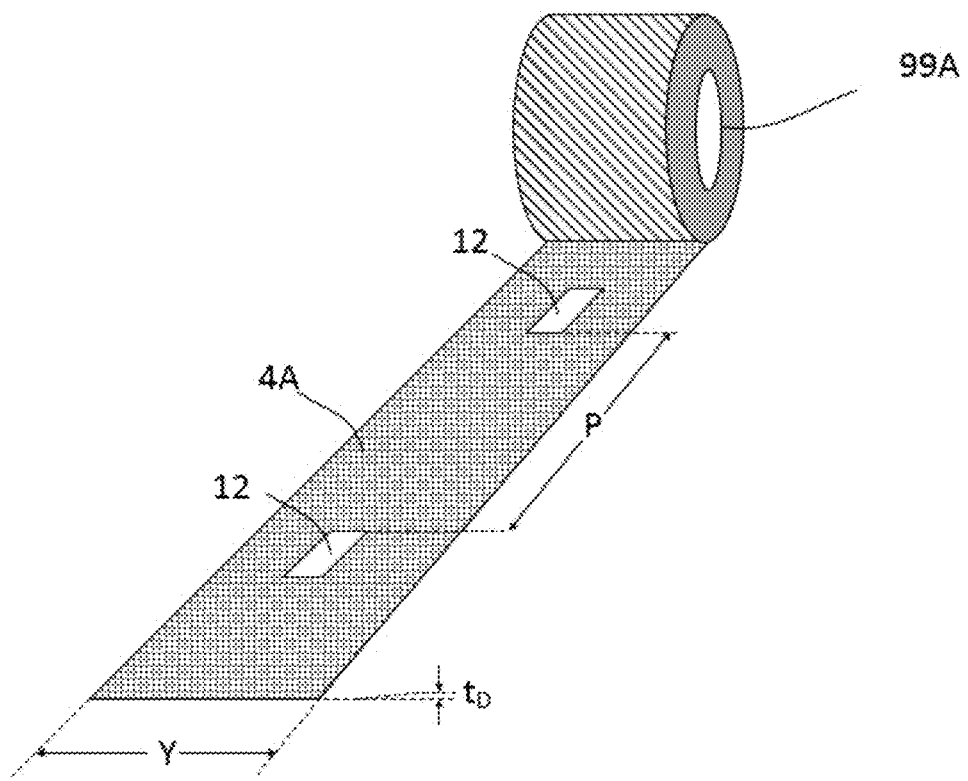

FIG. 2G depicts one embodiment of a sensing-element strip of moisture-wicking material with discrete RFID-based sensor tags integrated into the wicking material for an improved moisture-sensing membrane, and partially rolled-up.

Figure 2H:
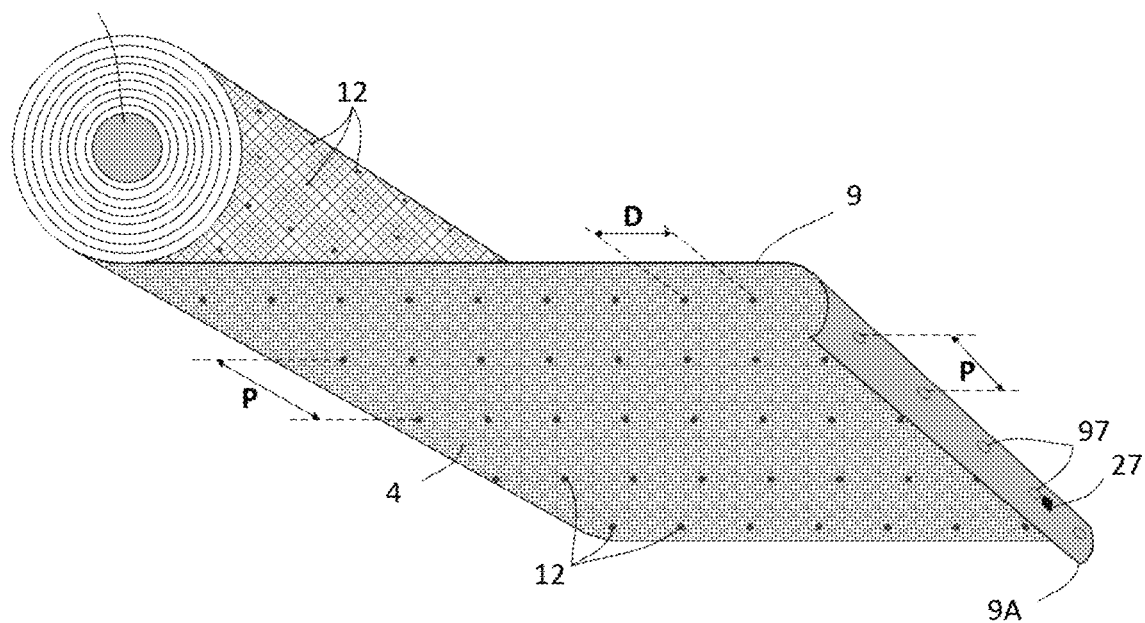

FIG. 2H depicts one embodiment of an improved roofing membrane with a moisture-wicking layer with discrete RFID-based sensor tags integrated into the wicking material attached to the proximal surface of the membrane and safe-to-fasten visual keep-away zones upon the distal surface of the membrane that are spatially aligned with the discrete RFID-based sensor tags.

Figure 2I:
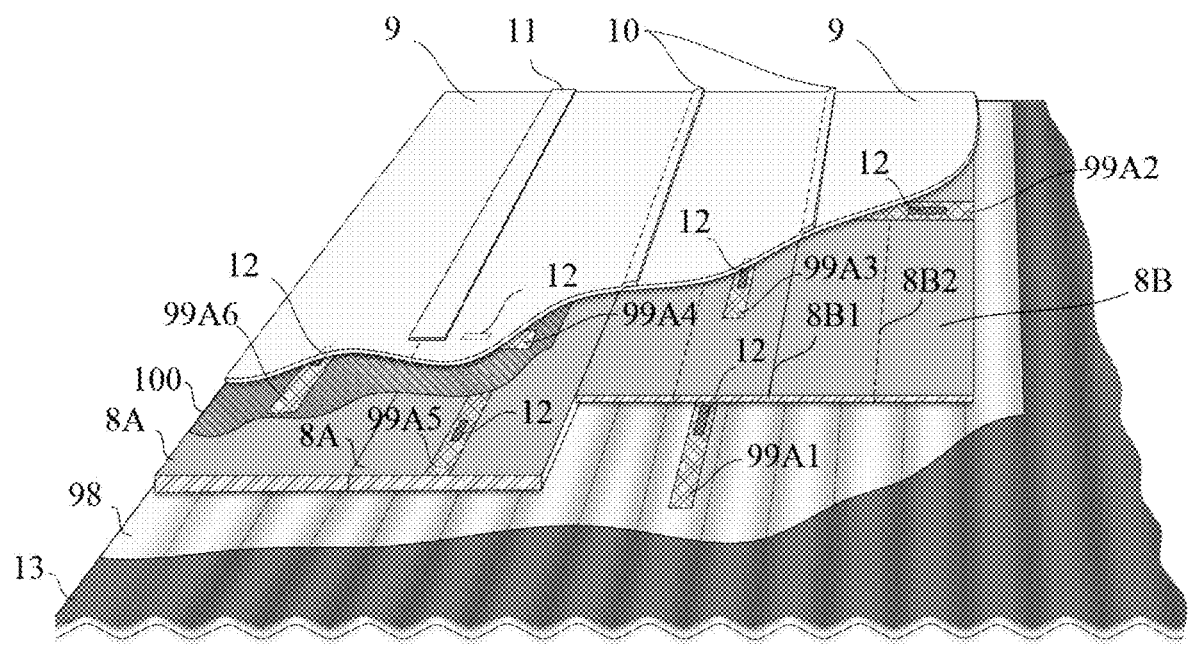

FIG. 2I depicts one embodiment of a notional isometric view of a building-roof structure with several methods of installing discrete moisture-sensing devices on horizontal surfaces.

Figure 2J:
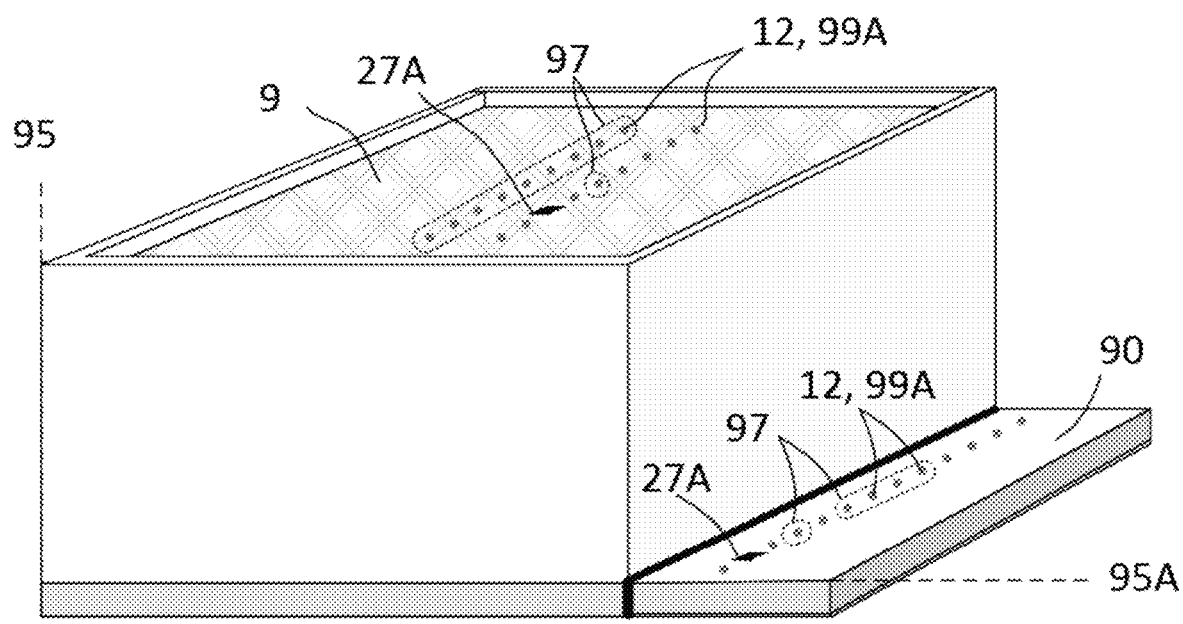

FIG. 2J depicts several configurations of installed envelope-protection systems on the horizontal surfaces of a notional structure. A corner of the structure is represented by vertical datum, and an upper edge of the structural foundation is represented by horizontal datum, both of which serve to facilitate the installation topographic-mapping method detailed in FIG. 5A and FIG. 4G.

Figure 3A:
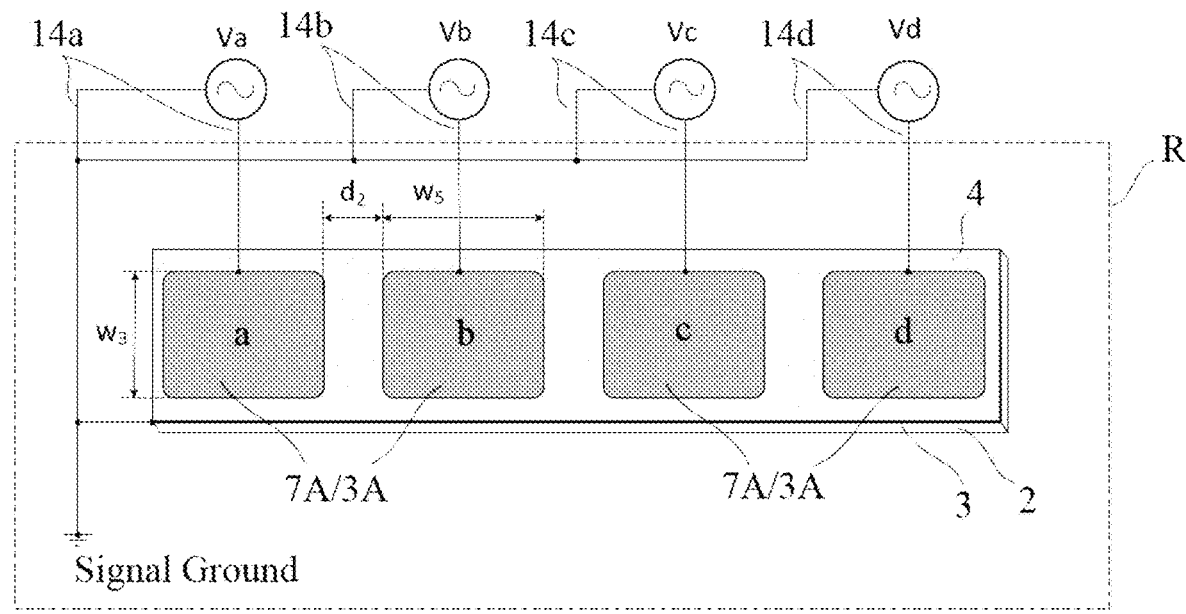

FIG. 3A depicts an electrical block-diagram of an embodiment of an improved composite moisture-sensing membrane.

Figure 3B:
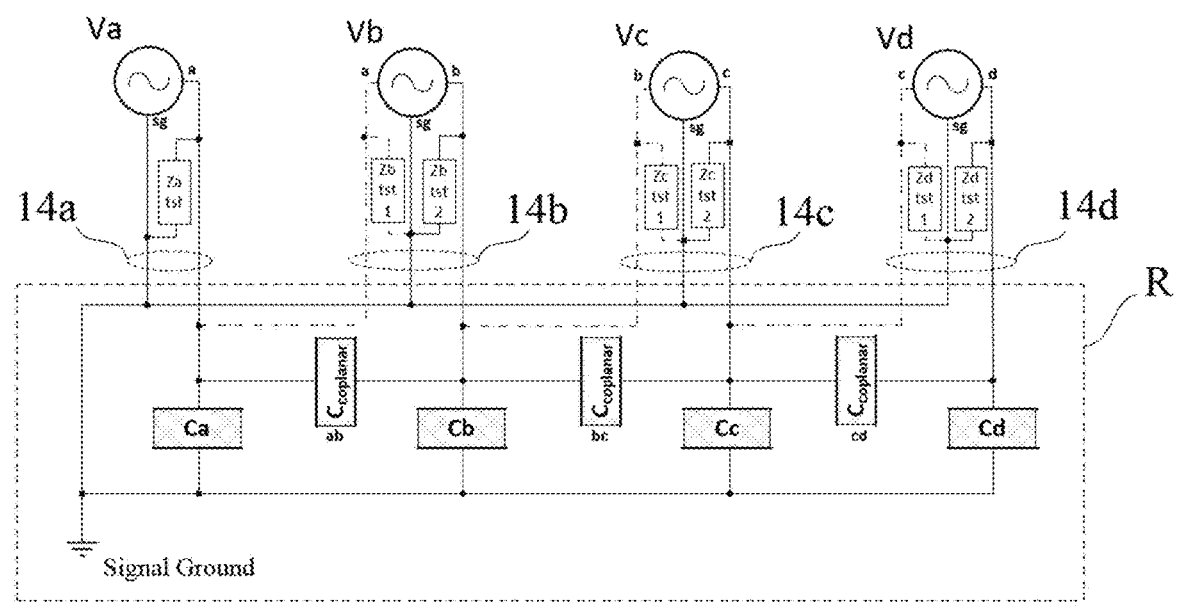

FIG. 3B depicts an embodiment of an electrical schematic diagram of the improved composite moisture-sensing membrane depicted in FIG. 3A with coplanar capacitance added.

Figure 3C:
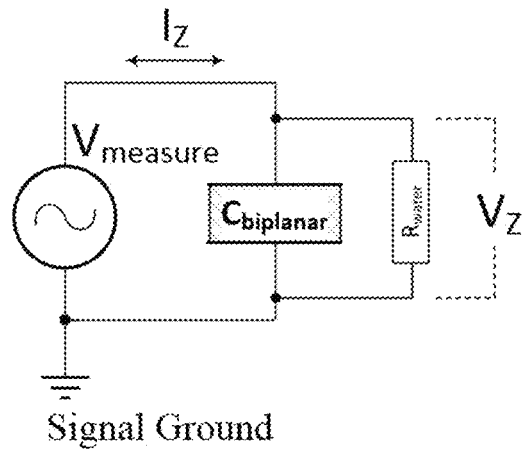

FIG. 3C depicts an embodiment of an electrical schematic diagram of a biplanar-capacitance measurement.

Figure 3D:
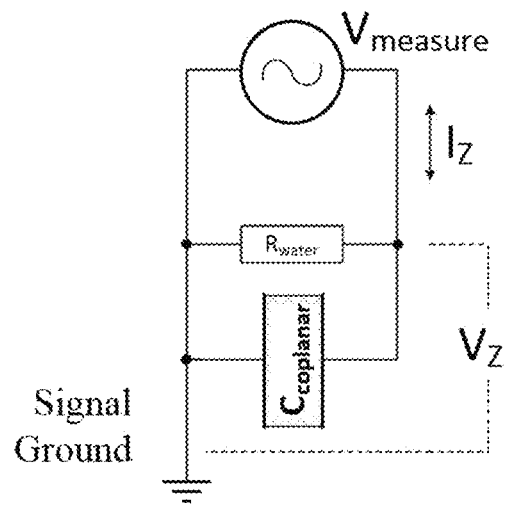

FIG. 3D depicts an embodiment of an electrical schematic diagram of a coplanar-capacitance measurement.

Figure 3E:
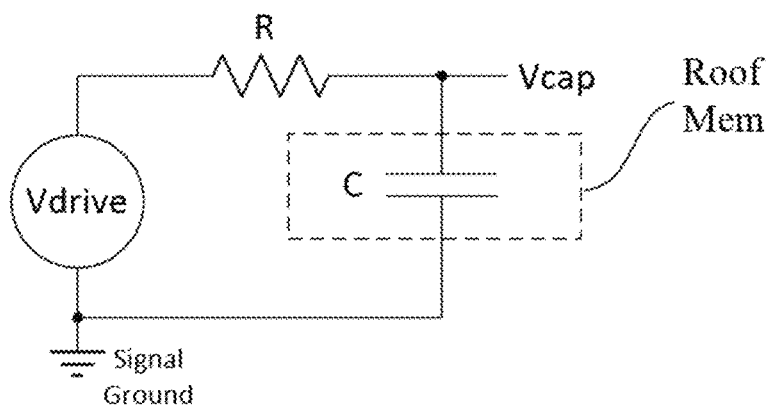

FIG. 3E depicts an embodiment of an electrical schematic diagram of a simple RC filter.

Figure 3F:
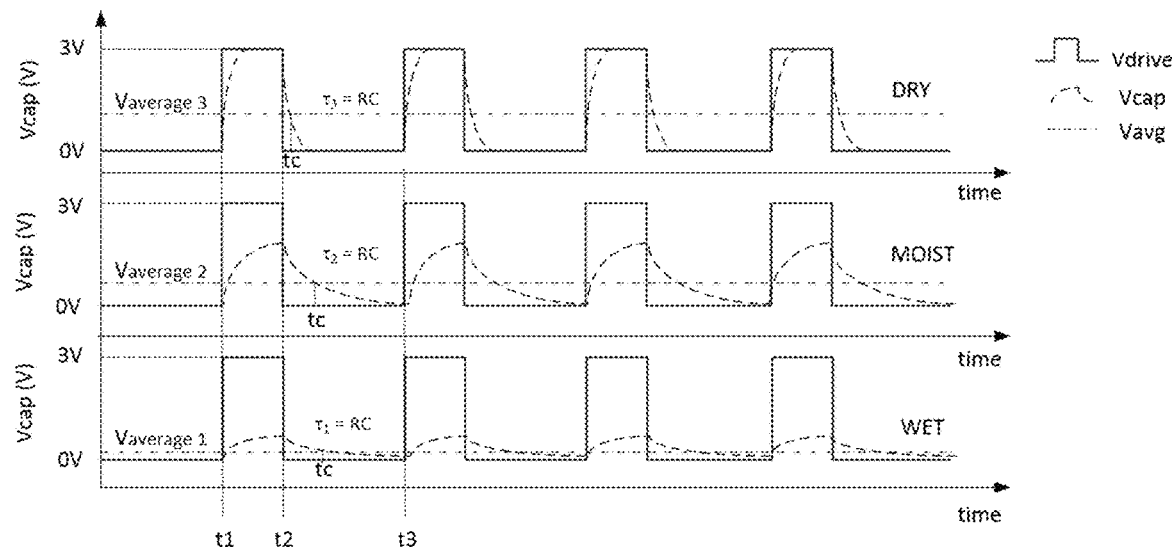

FIG. 3F depicts example electrical signals for several RC measurements.

Figure 4A:
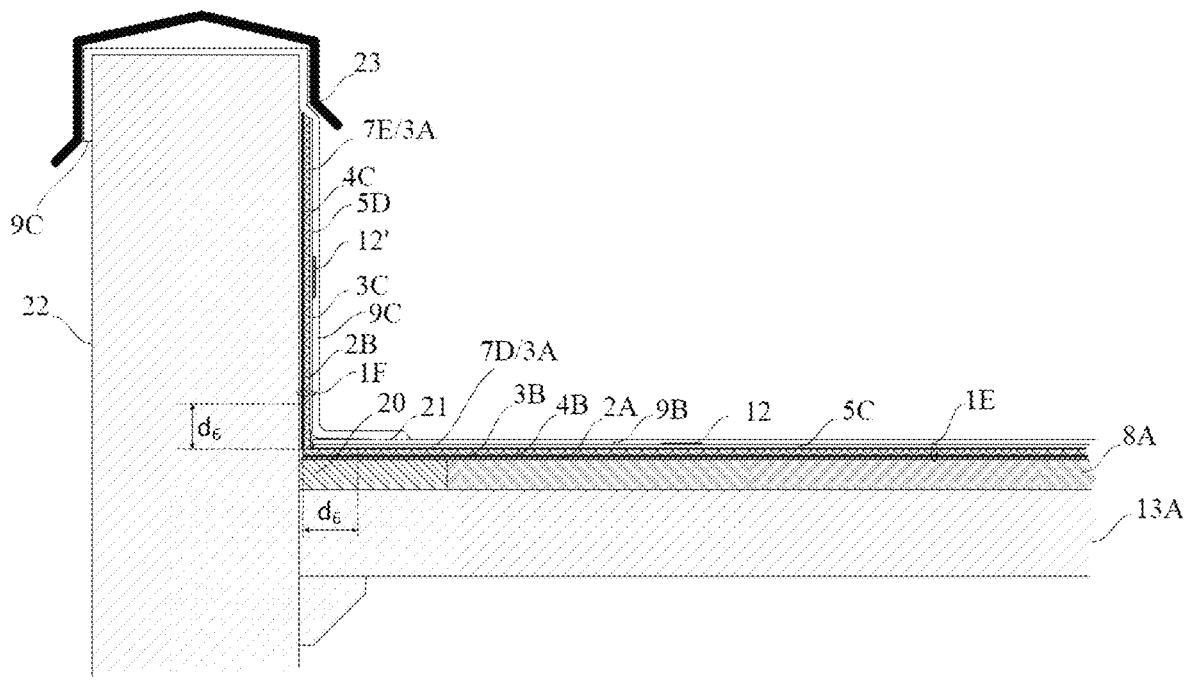

FIG. 4A depicts one embodiment of a cross-sectional view of a single-ply roofing installation with an improved composite moisture-sensing membrane on both the flat and vertical surfaces.

Figure 4B:
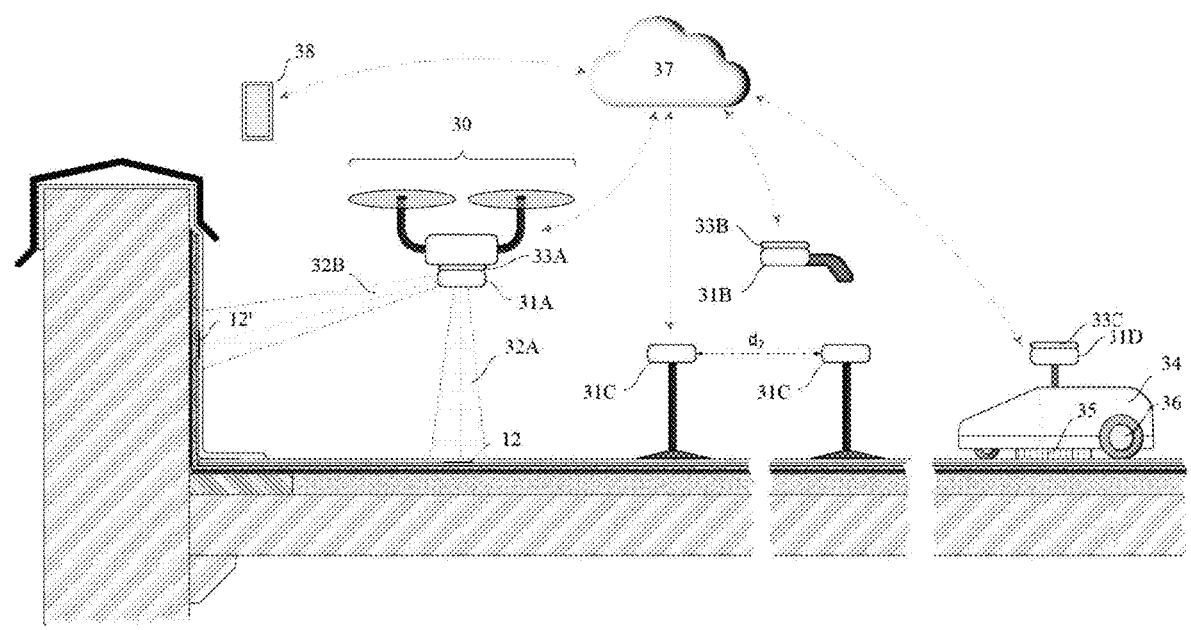

FIG. 4B depicts the FIG. 4A installation with several example embodiments of methods of wireless readout and data delivery to the cloud-application.

Figure 4C:
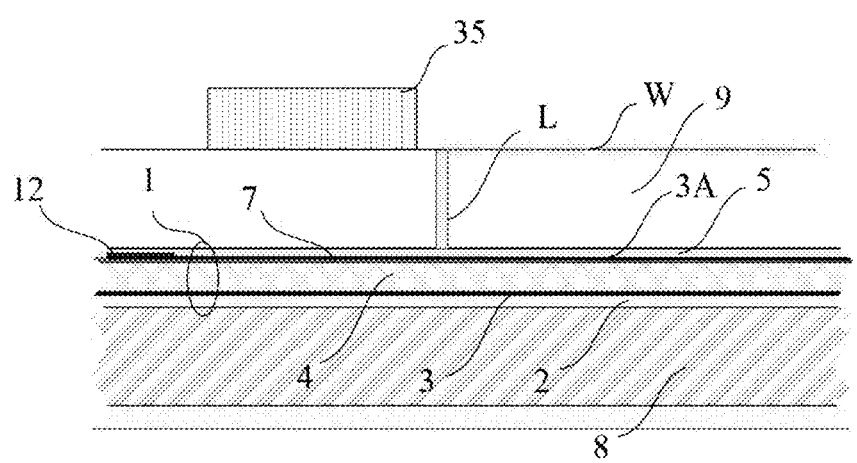

FIG. 4C depicts a detail for an embodiment of a method for how a wheeled robot (also see FIG. 4B) can further isolate the location of a leak within the larger leak-location area of the RFID sensor.

Figure 4D:
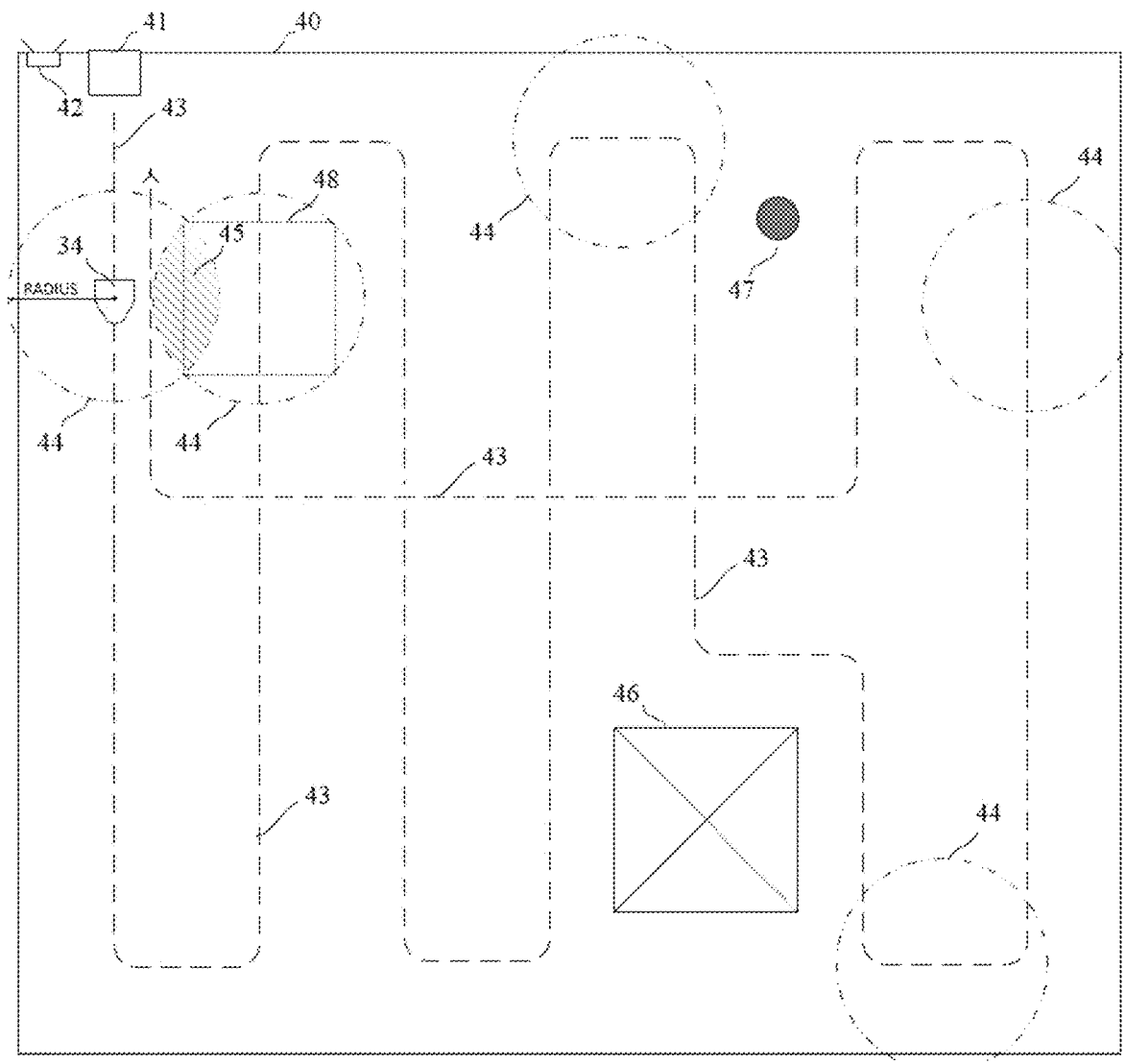

FIG. 4D depicts an embodiment for a method that uses a wheeled robot to obtain RFID data from the roof and the associated path planning.

Figure 4E:
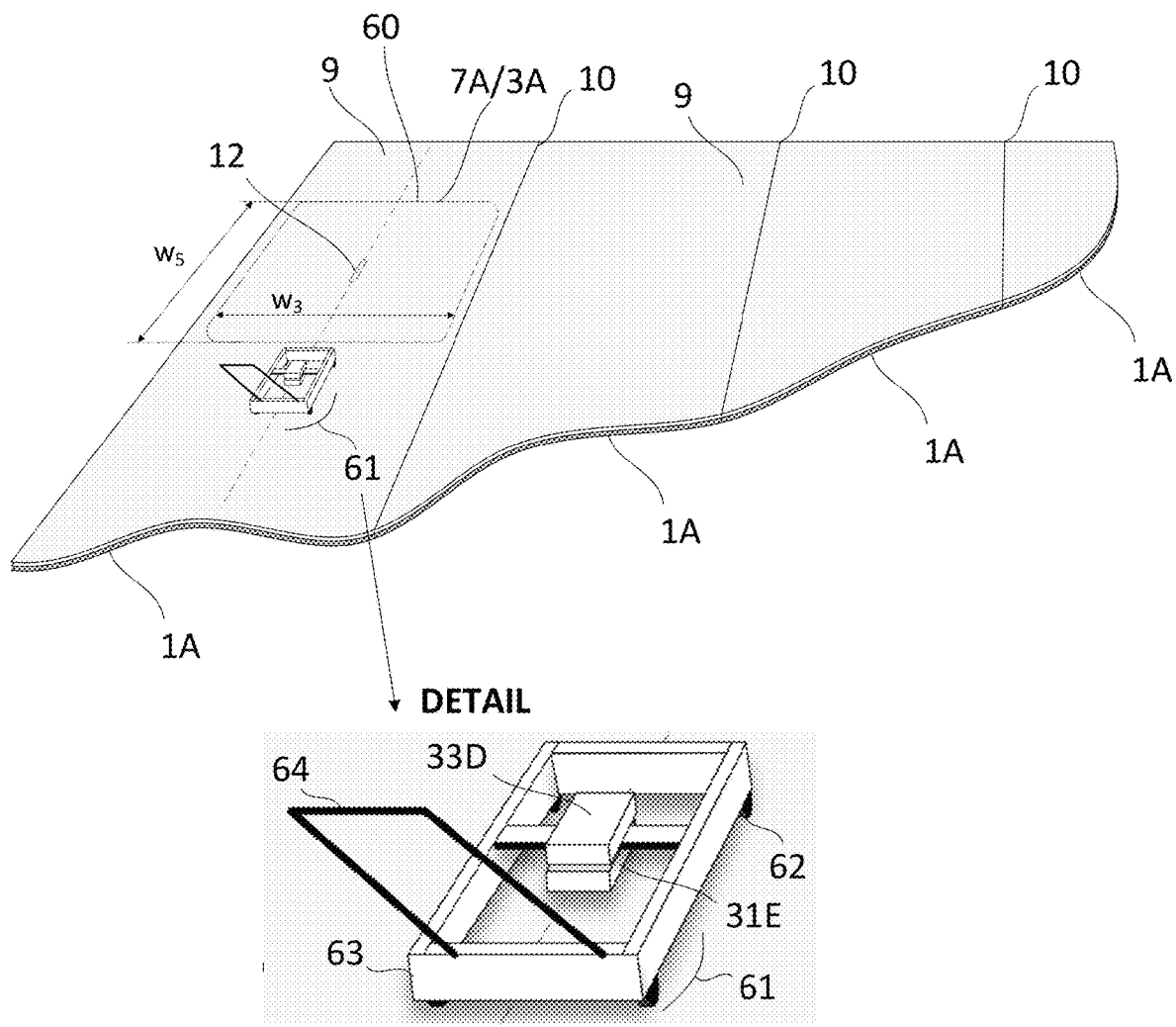

FIG. 4E depicts an embodiment for a method of performing a topographical mapping of a roofing installation.

Figure 4F:
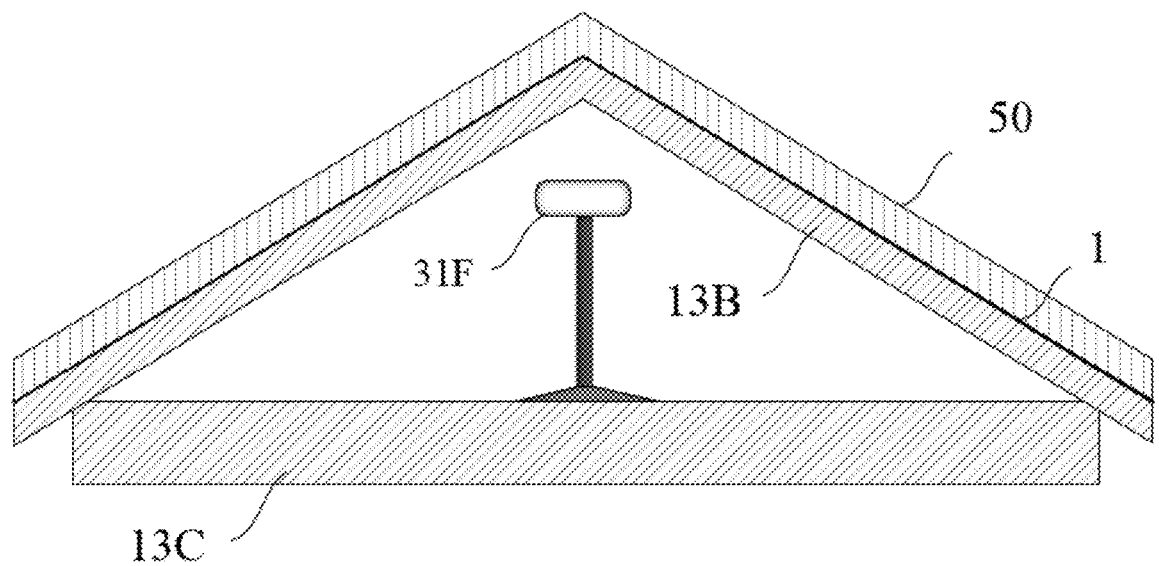

FIG. 4F depicts an improved peaked roof installation with an RFID reader below the roof to communicate with moisture-sensors.

Figure 4G:
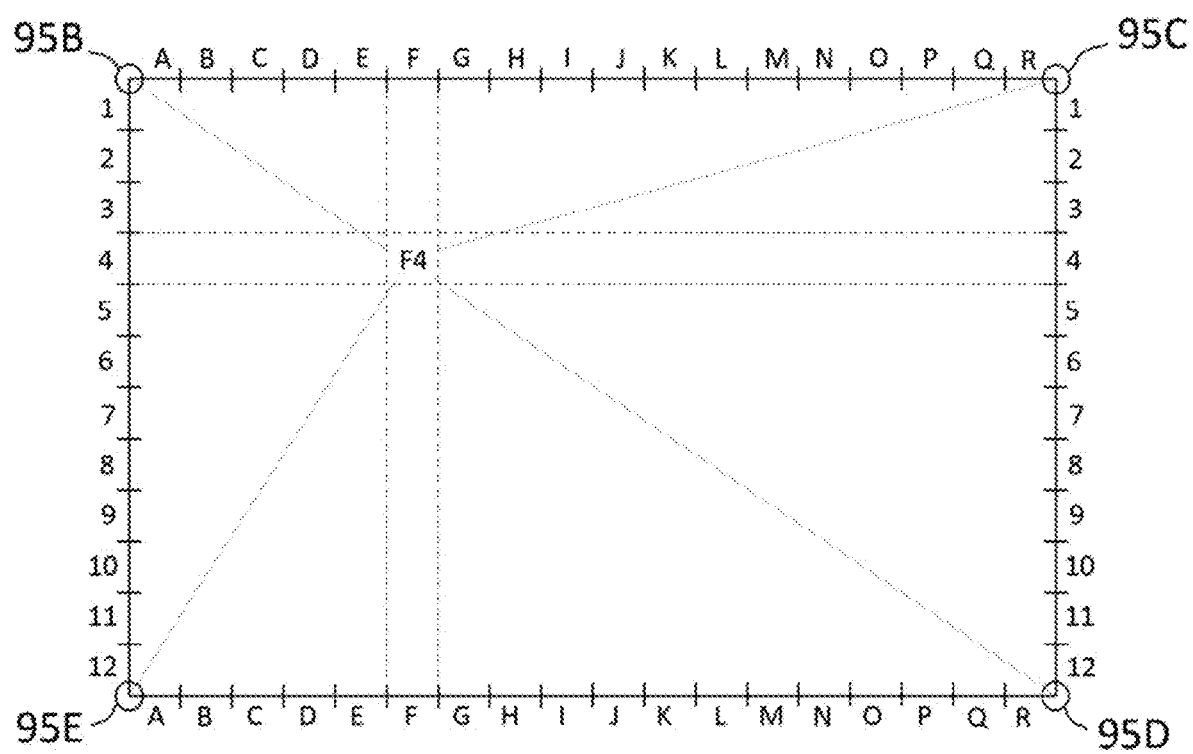

FIG. 4G depicts one embodiment of a visual directional coordinate system for an installed building-envelope-protection system.

Figure 5A:
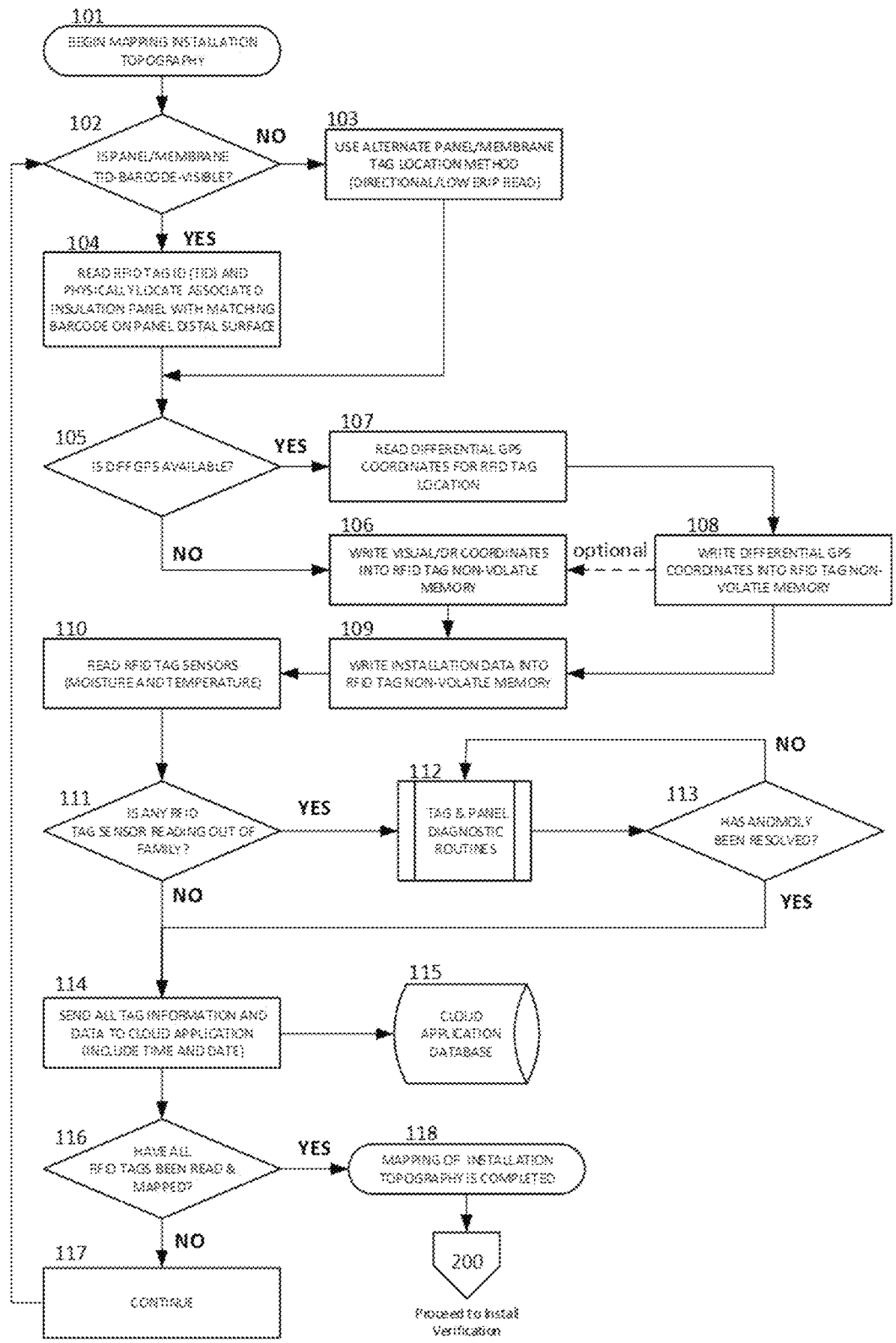

FIG. 5A depicts one embodiment of a method flow diagram for generating the installation topography of an improved "smart" building-envelope-protection system.

Figure 5B:
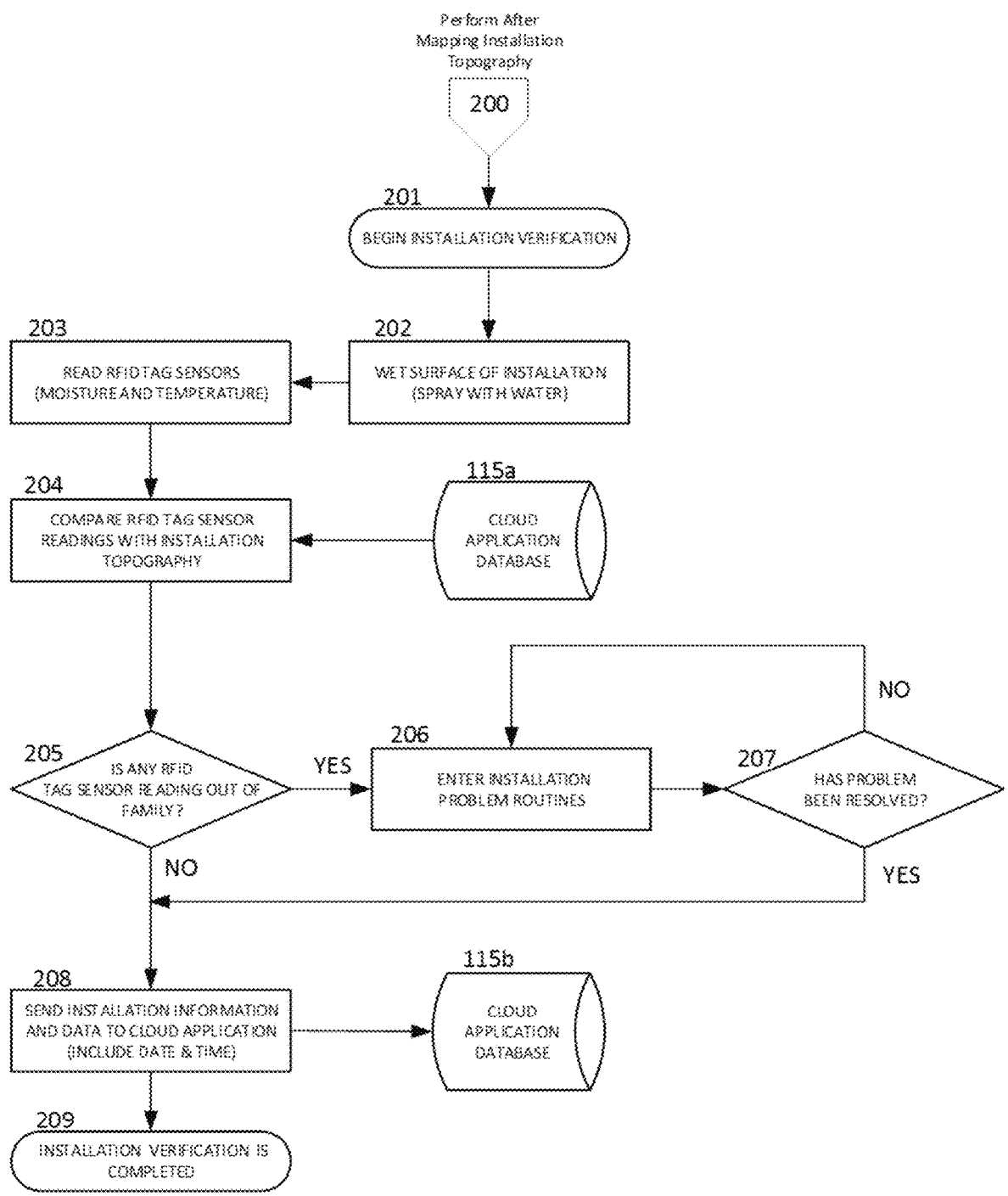

FIG. 5B depicts one embodiment of a method flow diagram for performing the installation verification of an improved "smart" building-envelope-protection system.

Figure 5C:
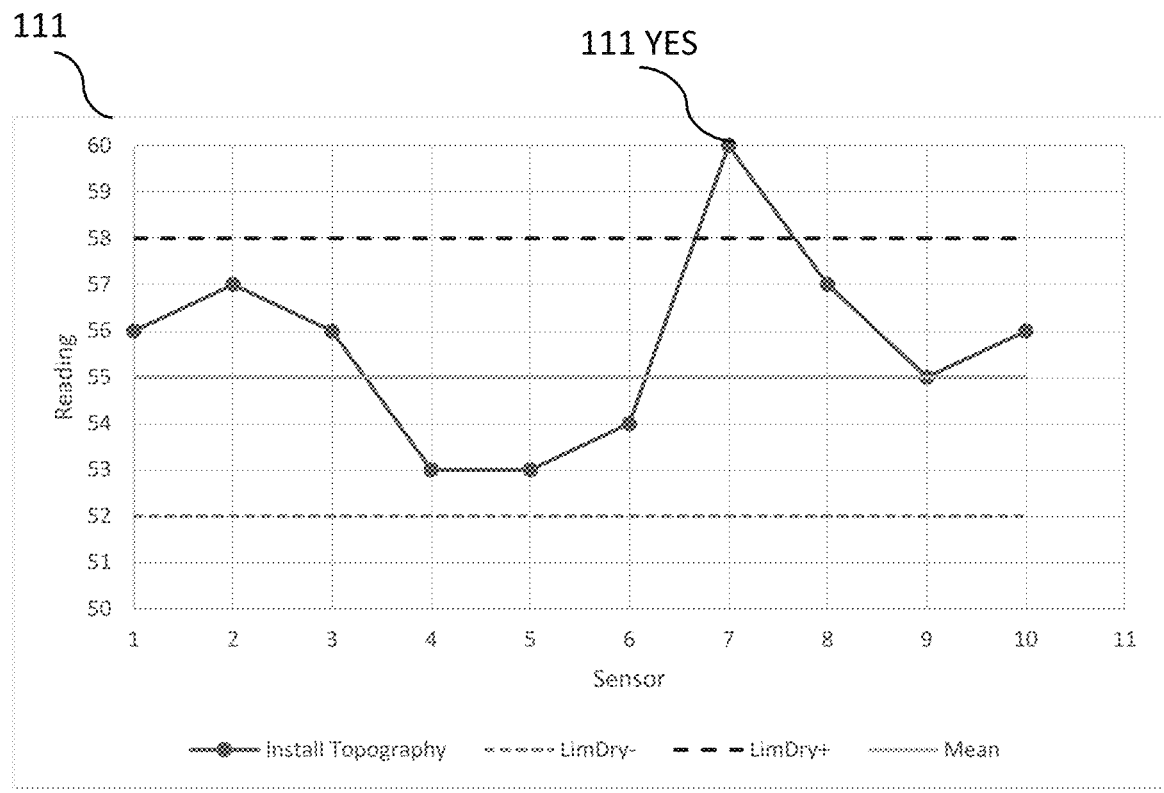

FIG. 5C depicts one embodiment of a graph used to verify the installation topography for an improved "smart" building-envelope-protection system by identifying out-of-family RFID-based sensor readings.

Figure 5D:
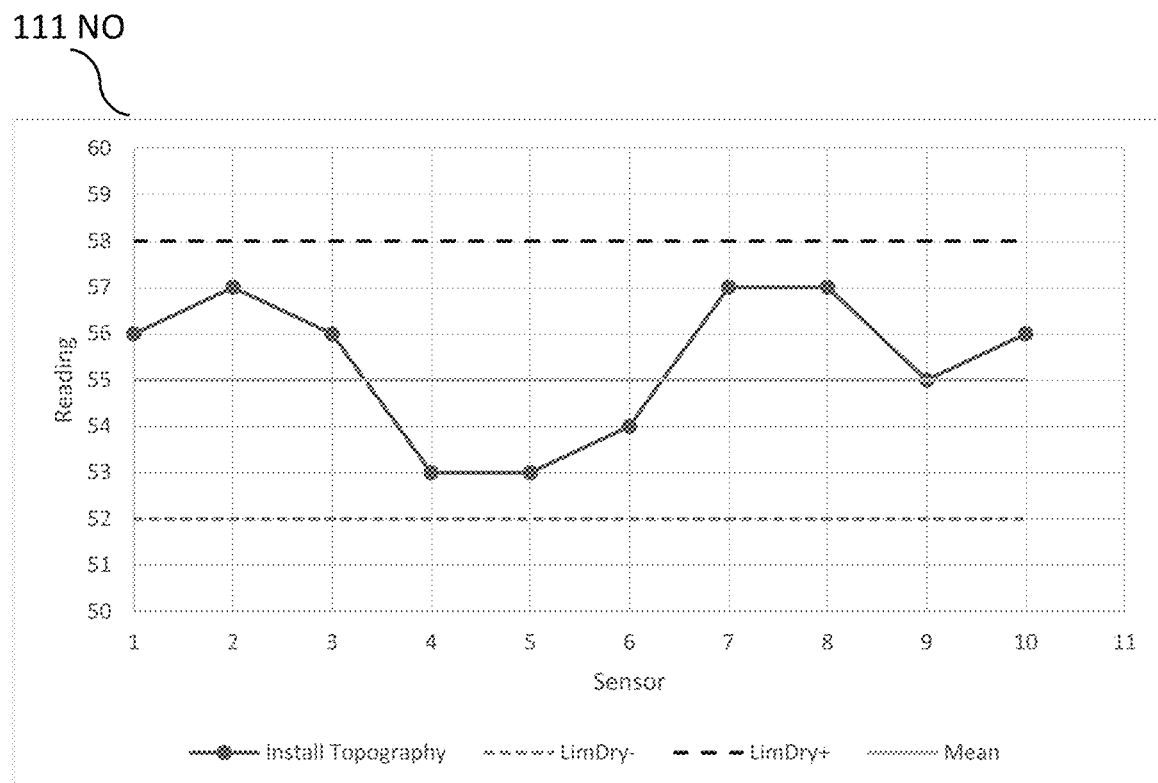

FIG. 5D depicts one embodiment of a graph of a verified installation topography for an improved "smart" building-envelope-protection system with all RFID-based sensors reading in-family.

Figure 5E:
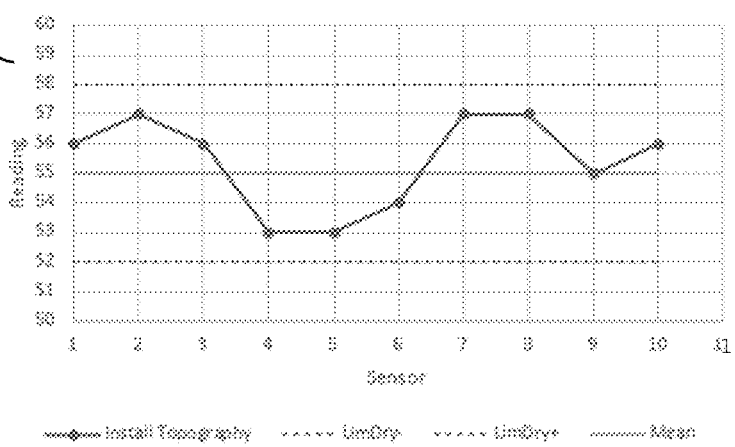
Figure 5E:
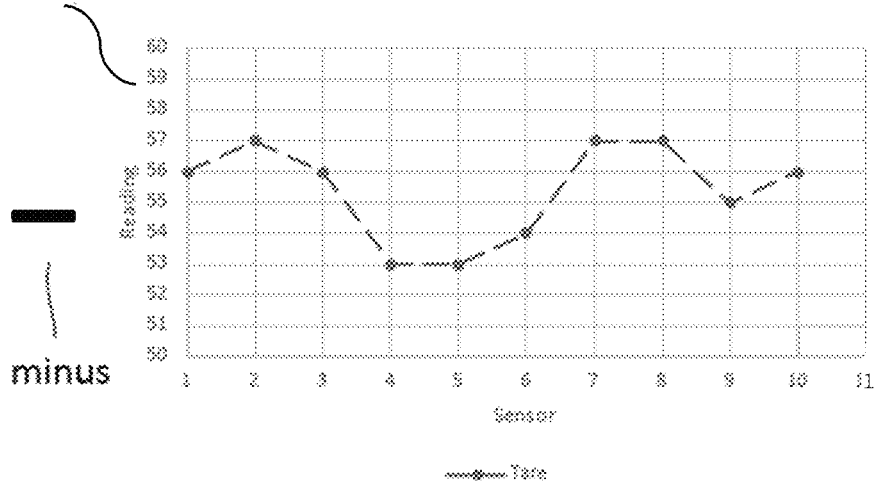
Figure 5E:
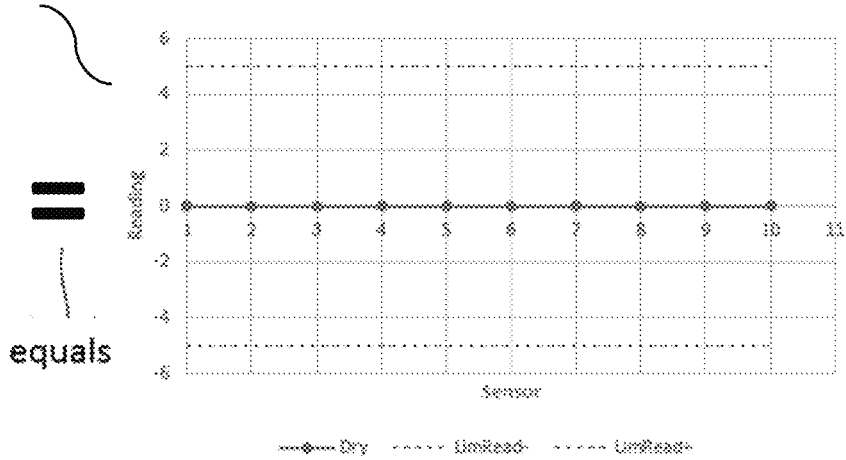

FIG. 5E depicts one embodiment of the graphs showing how the installation topography may be used to tare (or calibrate) moisture readings from an improved "smart" building-envelope-protection system.

Figure 5F:
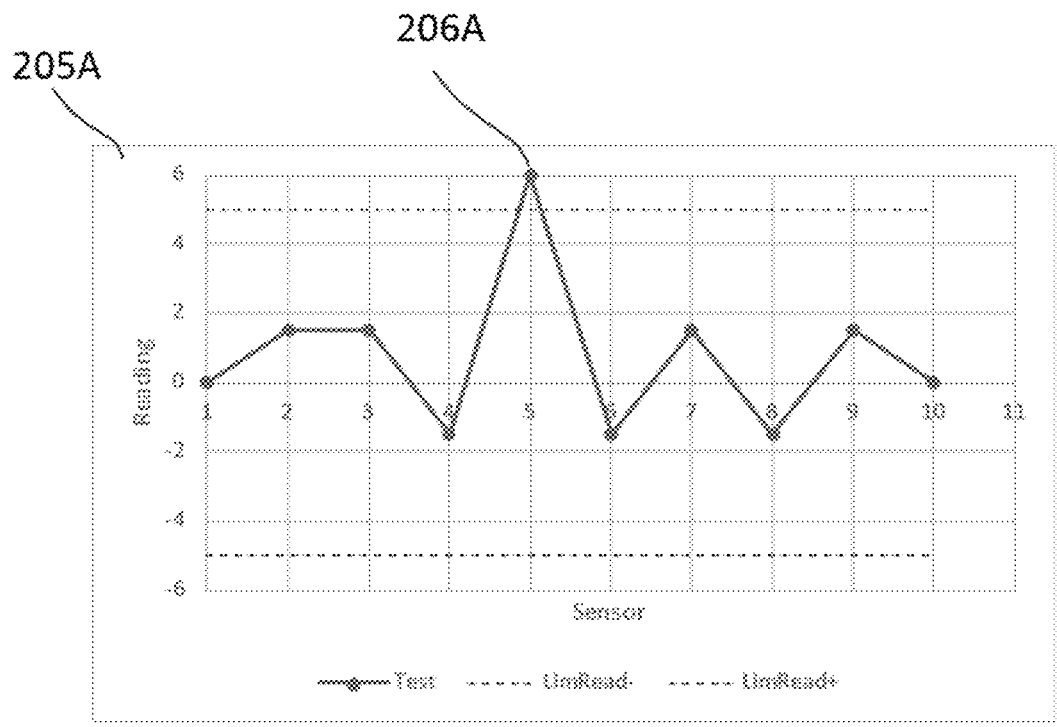

FIG. 5F depicts one embodiment of a graph showing how to verify the installation for an improved "smart" building-envelope-protection system by identifying out-of-family RFID-based sensors.

Figure 5G:
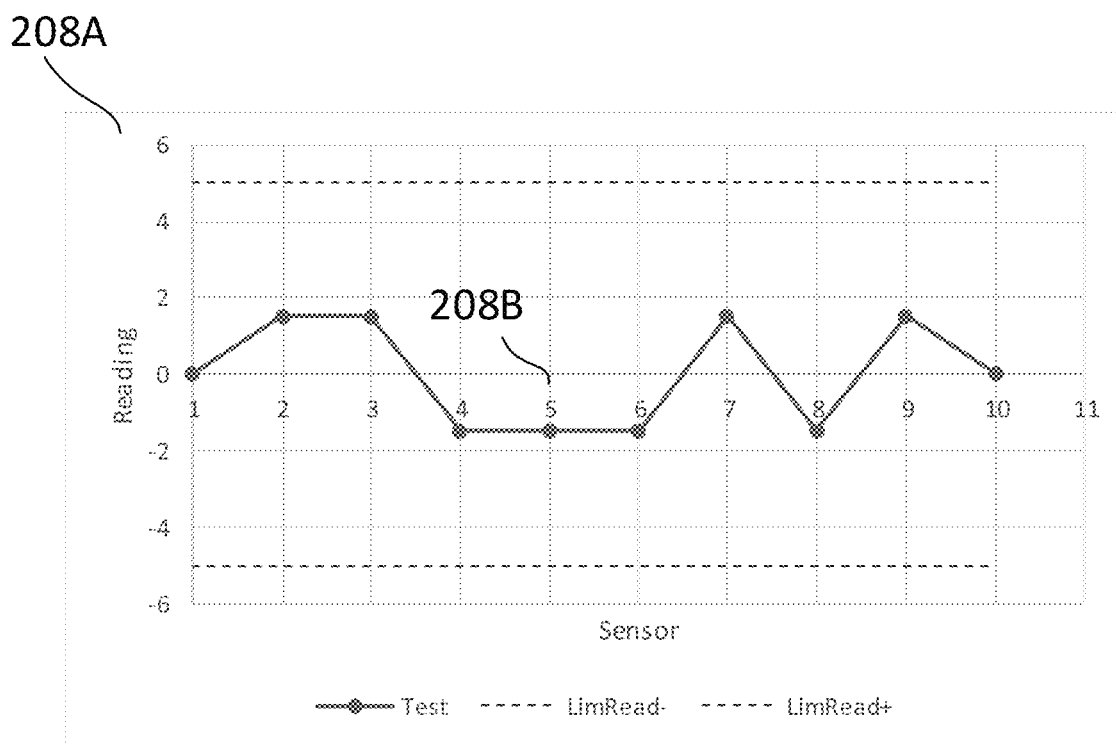

FIG. 5G depicts one embodiment of a graph showing how the installation for an improved "smart" building-envelope-protection system may appear after verification when all RFID-based sensors read in-family.

Figure 5H:
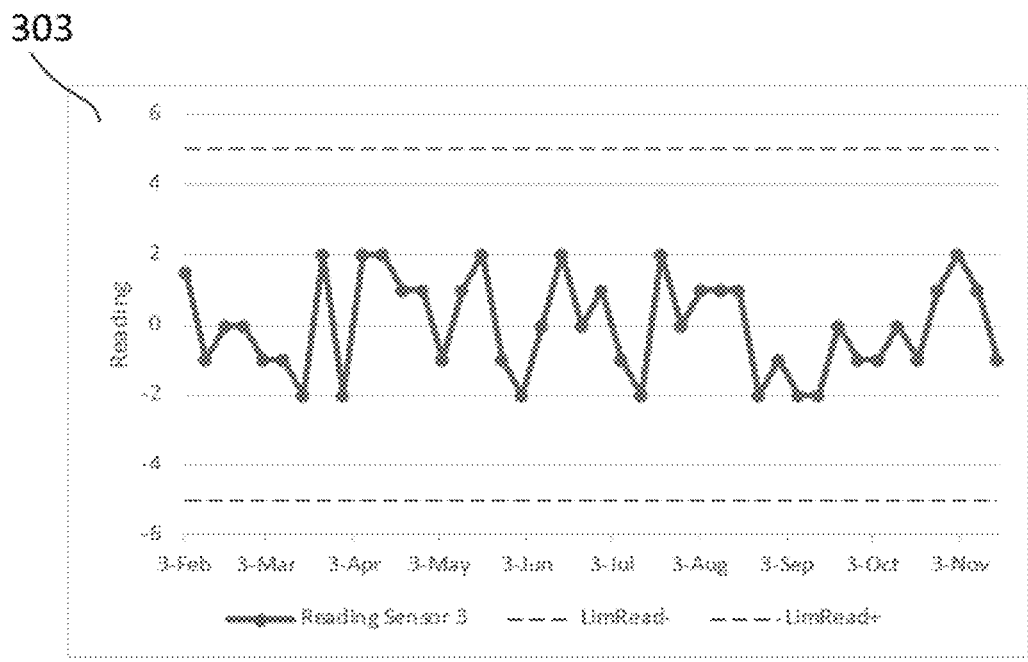

FIG. 5H depicts one embodiment of a graph showing how an improved "smart" building-envelope-protection system may be monitored over time.

Figure 5I:
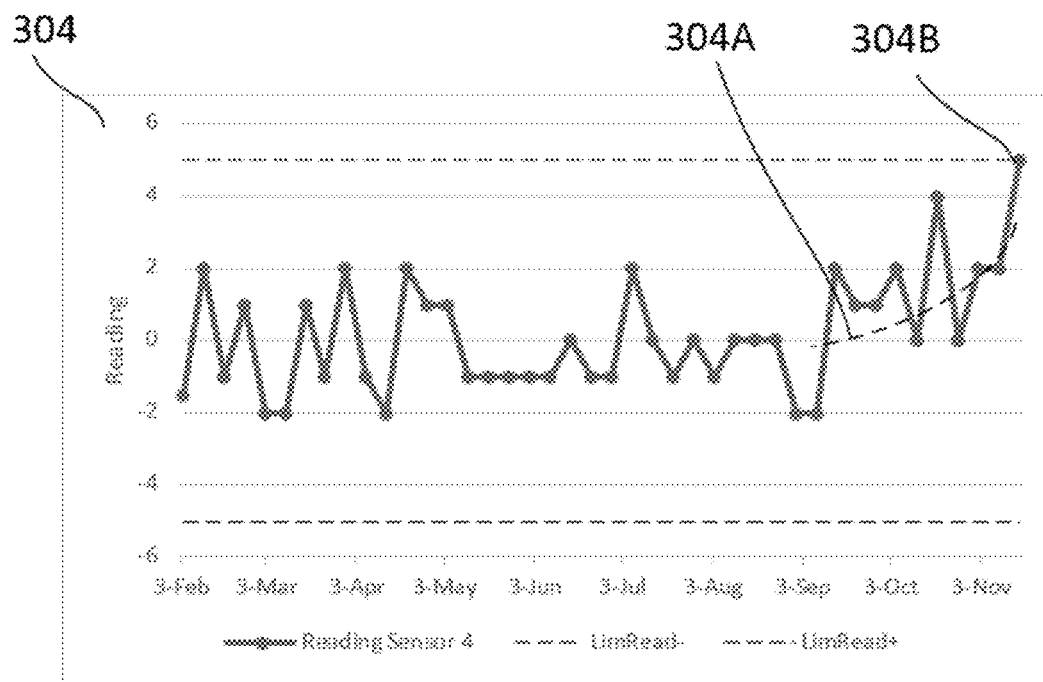

FIG. 5I depicts one embodiment of a graph showing how an improved "smart" building-envelope-protection system may be monitored over time to detect a trend that predicts and then shows that a building-envelope system has failed.

These drawings and diagrams are intended to provide notional configurations and are therefore not drawn to scale.

DETAILED DESCRIPTION

I. Overview

The inventive disclosures contained herein are designed to address the limitations in electrical or electronic leak-detection (ELD) used in the above-identified existing art, and primarily focus upon improvements to roofing systems with the addition of discrete sensors or an integrated moisture-sensing channel, thereby providing state-of-the-art single-ply roofing membranes with intrinsic leak-detection capability. The improved roofing membrane can be used as a separate component within a roofing system or can be factory-integrated with other roofing components. Although targeted for single-ply roofing installations, the improved roofing membrane is also be useful within layered roofing installations such as built-up-roofing (BUR) systems.

In one embodiment, a discrete moisture-sensing element or array of elements is applied into the distal (outward-facing) surface of an insulation board material, or onto the distal side of a fan-fold insulation layer. The discrete moisture-sensing element may be a strip of moisture-wicking material with a plurality of RFID-based sensors adhesively bonded to the moisture-wicking material.

In an alternate embodiment, a plurality of discrete RFID-based moisture-sensing elements is integrated with a roofing membrane by applying these discrete moisture-sensing elements or into the proximal (inward-facing) surface of a roofing membrane with adhesive and then covering the plurality of discrete moisture-sensing elements with a wicking layer or a series of separate coplanar wicking strips, and the electronic-nature of the detection technology allows the improved membrane in the roofing system to become 'smart' and respond to the presence of water and/or moisture within the roofing installation.

In a variation, a discrete moisture-sensing element or array of elements is applied or over the distal surface of a slip-sheet under a standard commercially-available roofing membrane, or over the distal surface of a vapor barrier sheet under an insulating layer of a roofing system, and the electronic-nature of the detection technology allows the improved roofing system to become 'smart' and respond to the presence of water and/or moisture within the roofing installation.

In other embodiments, a membrane with integrated moisture-sensing capability can be layered below a single-ply roofing membrane or at multiple levels within a layered roofing system, or on the non-bitumen or non-asphaltic layers of a BUR system. The moisture-sensing membrane has a hydrophilic wicking layer that draws in any water leaking through the roofing membrane or that is present within the roofing system, and because water has a much higher dielectric constant than the wicking layer material, the capacitance of the sensing device is increased by an order-of-magnitude or more, enabling the detection of any moisture through electronic means.

In another integrated-membrane embodiment, the capacitive-sensing device is a continuous metalized plane on the surface of the wicking layer closest (proximal surface) to the structural substrate and a plurality of metalized planar areas on the surface of the wicking layer furthest (distal surface) from the structural substrate. The dielectric material between the metalized planes is formed by the wicking layer. The bi-planar capacitance of this device is then used to sense the presence of moisture.

In another embodiment, there is no distal-surface continuous metalized plane, and instead, the co-planar capacitance between the metalized planar areas are used to sense the presence of moisture in the wicking layer. The advantage of the coplanar method of moisture-detection is its relative insensitivity to capacitance change due to compression of the wicking layer, which ca occur from roof-loading due to snow cover. In one variation, the metalized layers are formed by a VMD (vacuum metal deposition) process of metal onto a thin carrier membrane that is made of high-temperature polymer or fluoropolymer materials such as biaxially oriented polyethylene terephthalate (BoPET) film or polyvinylidene fluoride (PVDF) film, and the wicking layer is formed by a thin membrane of porous hydrophilic PVDF, a layer of untreated tightly-woven untreated nylon fabric, or any other higher-temperature hydrophilic porous membrane or moisture-wicking fabric material. For applications not concerned with the higher installation temperatures that result from the thermal-welding of roofing membrane seams, lower-temperature materials such as HDPE (High Density Polyethylene) membranes and PP/PE (polypropylene/polyethylene) porous wicking membranes can be substituted for the higher-temperature materials described above. The stack of layers can be bonded together through a friction-welding process or with an adhesive that exhibits low mobility into the wicking layer during the curing process.

A plurality of passive UHF (Ultra-High Frequency) RFID tags can be used to electrically excite the capacitive sensing devices within the integrated moisture-sensing membrane. In one embodiment, each RFID tag is connected to a flat set of conductive traces within a protective high-temperature film carrier such as Kapton (polyimide film), which is electrically-bonded to a capacitive-sensing device. In variations, each RFID tag is electrically-bonded directly to a capacitive-sensing device within the moisture-sensing membrane. In some variations, since the roofing membranes are not restricted by area, the RFID dipole antennas are made much larger than normally seen with UHF tags, thereby extending reading ranges.

The capacitance sensor provides the RFID tag with data needed to determine if leakage is occurring, and the unique digital code associated with each RFID tag allows the location/area of the leak to be determined. The physical area of each capacitive-sensing device determines the resolution of the leak-location capability.

For all integrated embodiments, the moisture-sensing devices use the change in electrical impedance within a detection element or elements to sense the presence of moisture by measuring: (i) the biplanar capacitance; or (ii) the change in electrical resistance; or (iii) the change in both the biplanar capacitance and the electrical resistance; or (iv) changes in the antenna impedance of the RFID sensor itself. Moisture is carried by a wicking material to the location of the detection element or elements with sufficient proximity to allow the presence of moisture to be detected.

In many embodiments, the initial installation of the improved moisture-sensing membrane within a roofing system requires the installation topography (moisture-reading, tag ID and physical location) to be mapped, which can be accomplished using an RFID reader in association with a surveyor-quality differential GPS device. In some variations, the installation topography is be mapped manually using a hand-held or drone-carried RFID reader and differential GPS device, while in other variations, the installation topography is mapped automatically using either an autonomous flying drone or a robot to carry the RFID reader and differential GPS device.

For most embodiments, a passive Ultra-High Frequency (UHF) radio-frequency identification (RFID) tag is used to facilitate the capacitive or resistive detection of moisture, or an antenna-based RLC-tuned circuit is used to enable an antenna to sense the presence of moisture. The RFID tag can be adapted from commercially available moisture-sensing tags or can be based on custom-engineered RFID sensor chips. For all embodiments, the detection elements are used to provide the RFID tag with data to determine if moisture is present within a building-envelope-protection system, and the unique digital code associated with each RFID tag, along with the RFID tag location, is written into the tag's non-volatile memory and/or associated within a relational database, thus allowing the panel or envelope section where the moisture is detected to be identified, thereby providing the location of the moisture within a building-envelope installation. In variations, the RFID tag non-volatile memory and/or the relational database can also contain historical details about the structure that the building envelope has been installed onto as well as information about the contractor who installed the building envelope.

In other variations, the RFID tag location data is written to the RFID tag and/or relational database during the topographical mapping portion of the installation verification method by using an external location device employing technologies such as, for example, Global Positioning System (GPS), differential GPS using RTK (Real Time Kinetics), Light Detection and Ranging (LIDAR)-based location, visual identification of tag location, or dead-reckoning based on the RFID tag's location with respect to an external location datum point. In more variations, the topographical mapping portion of the installation-verification method is performed manually by individuals, remotely using flying drones, automatically using robotic devices, or by a combination of these various methods. In still more variations, the RFID-based moisture-monitoring system allows the installation topography of a building-envelope-protection system to be mapped to allow any installation anomalies to be detected and corrected using statistical methods to detect out-of-family (OOF) sensor readings. The installation topography can be used to verify that a building-envelope-protection system functions correctly prior to releasing the system for service by detecting OOF sensor readings when a new building-envelope-protection system installation is wetted or flooded to test if the system successfully prevents the entry of moisture.

In some variations, a passive UHF RFID tag is used with capacitive or resistive sensing elements within the composite moisture-sensing membrane in order to measure the presence of moisture. In some embodiments, since the membranes and insulation panels are not restricted by physical tag area, the RFID dipole antennas are made much larger than normally seen with UHF tags, thereby significantly extending reading ranges.

In many embodiments, the moisture-detection sensors integrated into a building-envelope-protection system are used to provide the RFID tag with data to determine whether moisture is present within an envelope protection system, and the unique digital code associated with each RFID tag allows the tag location to be ascertained, thereby allowing the location of the moisture within an installation to be determined. This information is wirelessly transferred to an RFID reader and from the reader, and in some variations, the data is uploaded directly to a cloud-based application, while in other variations, the data is sent to the Internet via a wireless router and then on to the cloud-based application. The cloud-based application has the capability to display data trends and to perform predictive-analytics using applied statistics and machine-learning-based AI (Artificial Intelligence). The data stream from the RFID sensor to the cloud-based application is typically protected by a blockchain cryptographic hash, which ensures that the collection, storage, and readout of the data is secure by design, thereby enabling trust that the data has not been tampered with.

In additional embodiments, the initial installation of the improved moisture-sensing building-envelope-protection systems requires the installation topography to be mapped (that is, sensor-readings, tag ID, and physical location), and this is accomplished using an RFID reader in association with a standard GPS device or a Geographic Information System (GIS) differential GPS device. In an alternative embodiment, the installation topography is mapped manually using a hand-held RFID reader and GPS or differential GPS device, while in other embodiments, the installation topography is mapped using either a flying drone or a robotic device equipped with a high-resolution camera or video feed to carry the RFID reader and GPS devices. In all cases, at the time of the topographical mapping, data related to the installation; such as, for example, the GPS coordinates of the tag, the structure the tag is installed upon, and the identity of the installing contractor; is written to the RFID tag's non-volatile memory and protected by an encryption password using the RFID reader.

A flood-test may not be required in all applications, but the initial installation can be verified by merely wetting the surface of the roofing membrane. Because the leak-detection mechanism does not rely on standing water in order to determine whether leakage is occurring, vertical walls, sloped roofing, roof-to-wall flashing joints, and roofing penetrations such as vents and pipes, can also be tested through the simple wetting-verification process.

II. Terminology

The terms and phrases as indicated in quotes (" ") in this Section are intended to have the meaning ascribed to them in this Terminology Section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification, drawings, and any appended claims, is not meant to be exclusive; rather, the term is inclusive, meaning "either or both".

References in the specification to "one embodiment", "an embodiment", "a preferred embodiment", "an alternative embodiment", "other embodiments", "another embodiment", "a variation", "one variation", and similar phrases mean that a particular feature, structure, or characteristic described in connection with the embodiment is included in at least an embodiment of the invention. The appearances of the phrase "in one embodiment", "in one variation", and/or similar phrases in various places in the specification are not necessarily all meant to refer to the same embodiment.

The term "couple" or "coupled", as used in this specification, drawings, and any appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", "detachably coupled", and similar terms, as used in this specification, drawings, and any appended claims, refer to structures that can be uncoupled from an adjoining structure with relative ease (i.e., non-destructively and without a complicated or time-consuming process) and that can also be readily reattached or coupled to the previously adjoining structure.

The terms "transverse" and "longitudinal" as used in this specification, drawings, and any appended claims, respectively refer to the short or widthwise dimension of a membrane, and the long or lengthwise dimension of a membrane. The transverse direction (TD), when used with a membrane or panel, refers to the direction across the short dimension. The longitudinal direction (LD), when used with a membrane or panel, refers to the direction along the long dimension. The LD also refers to the so-called "machine" direction (MD), which is the direction a roll is processed (unrolled and/or rolled) during the manufacturing process.

As used in this specification, drawings, and any appended claims, directional and/or relational terms such as, but not limited to, left, right, nadir, apex, top, bottom, vertical, horizontal, back, front, lateral, proximal, and distal are relative to each other, are dependent on the specific orientation of an applicable element or article, are used accordingly to aid in the description of the various embodiments, and are not necessarily intended to be construed as limiting in this specification, drawings, and any appended claims.

Similarly, as used in this specification, drawings, and any appended claims, the terms "over" and "under", are relative terms. For example, the improved moisture-sensing membrane strip is positioned "over" the proximal surface side of the insulation panel because the proximal surface side is designated as the surface nearest to the structural substrate.

The terms "discrete" and "integrated" are used to associate the relationship of the moisture-sensing elements with roofing or decking membranes. "Discrete" implies that the sensing elements act as stand-alone sensors within a membrane installation, while "integrated" implies that the sensing elements are part of the membrane and therefore act in conjunction with the membrane.

As applicable, the terms "about" or "generally" or "approximately", as used herein unless otherwise indicated, means a margin of +/−20%. Also, as applicable, the term "substantially" as used herein unless otherwise indicated means a margin of +/−10%. The terms "nominal" and "nominally" are used to indicate dimensions within a margin of +/−5%. The terms "reference" or "reference value" refer to non-critical dimensions or characteristics. The terms "typical" or "typically" refer to methods, compositions, or dimensions used in current-art and/or commercially available applications (including when current-art and/or commercially available applications are incorporated in the improved applications described herein). It is to be appreciated that not all uses of the above terms are quantifiable such that the referenced ranges can be applied.

III. An Improved Roofing Installation with Intrinsic Leak-Detection System

Figure 1A:
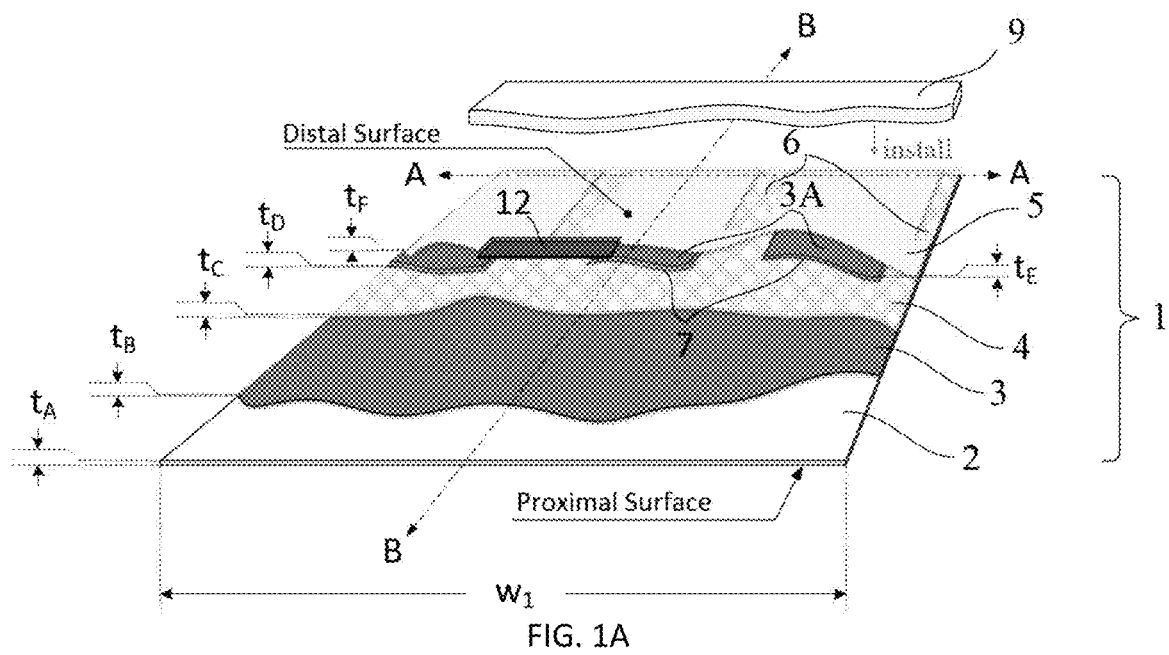
FIG. 1A depicts a fragment of one embodiment of an improved composite moisture-sensing membrane with its various layers.

This Section III is directed to an improved roofing system with intrinsic leak-detection capabilities for use in building structures, such as horizontal and vertical roofing structures that are disposed above ground. Refer to FIGS. 1A though 5I.

Associated Moisture-Sensing Elements

Figure 1B:
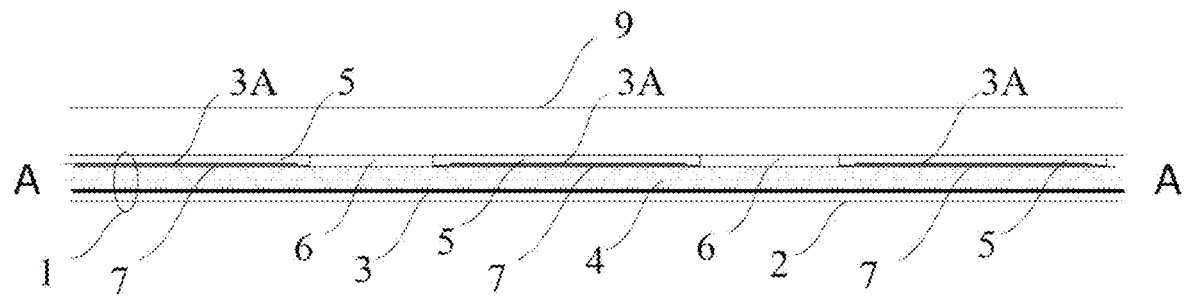
FIG. 1B depicts a cross-section along Axis AA of the improved composite moisture-sensing membrane with its various layers depicted in FIG. 1A.
Figure 1C:
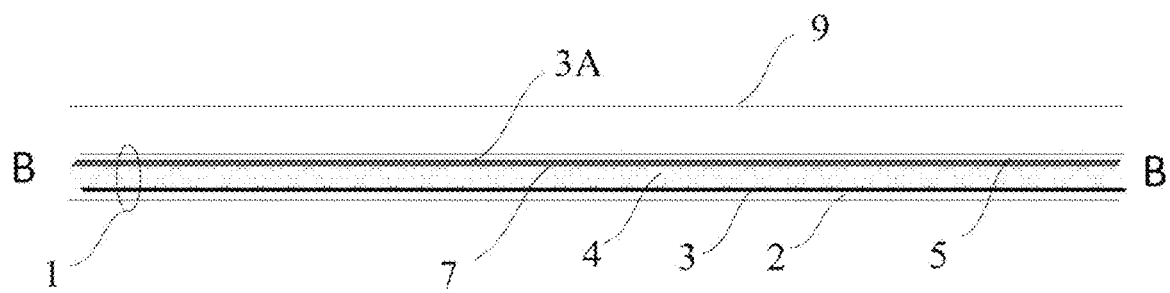
FIG. 1C depicts a cross-section along Axis BB of the improved composite moisture-sensing membrane with its various layers depicted in FIG. 1B.

Refer to FIGS. 1A, 1B, and 1C. A fragment of one embodiment of the improved moisture-sensing roofing membrane is isometrically depicted in FIG. 1A showing composite moisture-sensing membrane 1 with its various layers 2, 3, 3A, 4, 5, 7. A base membrane 2 with thickness $t_A$ is composed of high-temperature polymer or fluoropolymer materials such as BoPET or PVDF film, with melting temperatures of around 480° F. and 350° F., respectively. For lower-temperature applications, the base membrane 2 with thickness $t_A$ can be composed of HDPE (high-density polyethylene), which has a melting temperature around 250° F. Thickness $t_A$ is approximately 8 mils, but this dimension can vary depending on the application and membrane 1 configuration. A metalized coating 3 on the distal surface of base membrane 2 of thickness $t_B$ can be created using a vacuum-metal-deposition (VIVID) process. In a preferred embodiment, the metalized layer 3 is a coating of >99.9% pure aluminum with an optical depth is of >125 Angstroms, although other metals can be used. Additionally, the metalized layer can be created by sputter-deposition process (which is often performed with indium-tin-oxide, though other metals can be used). In all cases, the metalized layer should exhibit a surface resistivity<5.0 ohms/square when measured in accordance with ASTM D257. Wicking layer 4 of thickness $t_C$ can be formed from porous hydrophilic polyvinylidene fluoride (PVDF) or any other high-temperature hydrophilic porous-membrane material. Thickness $t_C$ is approximately 10 mils; however, this dimension can vary depending on the application and membrane 1 configuration. Alternatively, the wicking layer 4 can be composed of untreated (i.e., there are no water-repellant chemical additives) nylon 70 denier fabric with a taffeta weave, or other tightly woven pattern, and with a thickness $t_C$ of approximately 13 mils. The untreated nylon exhibits hydrophilic wicking behavior with moisture. (Untreated nylon fabric is often used as a liner for sports equipment or clothing to wick perspiration away from an athlete's skin.) For lower-temperature applications, a hydrophilic layer of polyethylene/polypropylene (PE/PP) with a thickness $t_C$ of approximately 10 to 20 mils can be used, but dimension $t_C$ may be varied depending on the application and membrane 1 configuration. It should be recognized for those skilled in the art that the wicking layer 4 can be composed of any porous hydrophilic material with appropriate dimensional, chemical, and thermal properties that facilitates its function as a dielectric material that varies with water content and conforms to the intended environmental and installation applications.

Wicking layer 4 is attached to the metalized coating 3 on the distal surface of base membrane 2 using any low volatile-organic-compound (VOC) adhesive with low mobility into wicking layer 4 during the curing process. A plurality of sensing areas 3A, 7 can be attached to the distal surface of wicking layer 4 using any low-VOC adhesive with low mobility into wicking layer 4. Sensing areas 3A, 7 can be formed by a VMD aluminum coating 3A with thickness $t_F$ and with the same characteristics as metalized layer 3, over a sensing membrane 7 composed of BoPET film of thickness $t_D$, where thickness $t_D$ is approximately 4 mils or less, although sensing membrane 7 can be composed of any other polymer or fluoropolymer material with appropriate temperature and mechanical properties that conforms to the intended environmental and installation applications. A covering membrane 5 with thickness $t_E$ is composed of high-temperature polymer or fluoropolymer materials such as BoPET film or PVDF film and can have a plurality of openings 6 to allow moisture on the distal surface of composite moisture-sensing membrane 1 to enter wicking layer 4, although covering membrane 5 can alternatively be composed of any other polymer or fluoropolymer material with appropriate temperature and mechanical properties that conforms to the intended environmental and installation applications. For lower-temperature applications, the covering membrane 5 can be composed of high-density polyethylene (HDPE). The thickness $t_E$ is approximately 8 mils. The size, shape, arrangement, and quantity of openings 6 can vary depending on the application and membrane 1 configuration, which is illustrated notionally.

The composite moisture-sensing membrane 1 can, therefore, be composed of a plurality of adhesively-attached layers and materials as described above, with an overall thickness to $t_A+t_B+t_C+t_D+t_E+t_F$, or approximately 30 to 40 mils, depending on the configuration. The strength of the adhesive bonds between layers should be sufficient to allow the composite moisture-sensing membrane 1 to be stored and transported in rolled form and enable the composite moisture-sensing membrane 1 to be unrolled and moved into place on the jobsite during installation. The adhesives used should be chemically compatible with the materials of the various layers and should be capable of withstanding the environmental conditions of the roofing installation (temperature extremes and moisture). Examples of such adhesives are TremPly® TPO Bonding Adhesive and TremPly® TPO LV Bonding Adhesive. Alternatively, a mechanical friction-welding process can be used to bond the various layers together instead of adhesive or can be used in combination with adhesives to bond the various layers together.

Single-ply roofing membrane 9 can be installed directly over the distal surface of composite improved moisture-sensing roofing membrane 1. Any leakage past the single-ply roofing membrane 9 will contact the improved moisture-sensing roofing membrane 1. Within the composite improved moisture-sensing membrane 1, wicking membrane 4 will have a relative permittivity (i.e. dielectric constant) of approximately 1.5 to 2.4 for polymer (i.e., polyethylene 2.2 to 2.4 [http://www.clippercontrols.com/pages/Dielectric-Constant-Values.html#P]) materials and approximately 3 to 5 for nylon (i.e., nylon 4.0 to 5.0, nylon resin 3.0 to 5.0 [http://www.clippercontrols.com/pages/Dielectric-Constant-Values.html#N]), while water has a relative permittivity of 80.2 at 68° F. (20° C.). Therefore, between the dry and wet states of wicking membrane 4, both the biplanar capacitance between a sensing membrane 7 with metalized coating 3A and base membrane 2 with metalized coating 3, and the coplanar capacitance between adjacent sensing membranes 7 with metalized coatings 3A, can change by a factor of 20 to 50 (greater than one order of magnitude), allowing an external electronic-measurement device to electronically detect the presence of any water absorbed into wicking membrane 4 within the improved moisture-sensing roofing membrane 1. A wireless RFID tag 12 is depicted notionally, installed within an opening in covering membrane 5, and electrically connected between a set of adjacent sensing membranes 7 with metalized coatings 3A to measure coplanar capacitance. The opening in covering membrane 5 as depicted for the installation of wireless RFID tag 12 can be one of the plurality of openings 6 or can be a special opening for wireless RFID tag 12.

FIG. 1B depicts a cross-section along Axis AA of the composite improved moisture-sensing roofing membrane 1 with its various layers, as depicted in FIG. 1A. Here, single-ply roofing membrane 9 is shown installed over the composite improved moisture-sensing roofing membrane 1. The plurality of openings 6 in covering membrane 5 may facilitate the passage of water that has leaked through single-ply roofing membrane 9 into wicking layer 4.

FIG. 1C depicts a cross-section along Axis BB of the composite improved moisture-sensing roofing membrane 1 with its various layers as depicted in FIG. 1A. In this view, the plurality of openings 6 in covering membrane 5 are not visible. If there is any leakage through the roofing membrane 9 in a location where there is no opening 6 in covering membrane 5, then it is expected that capillary action will cause the leakage water to move between the proximal surface of single-ply roofing membrane 9 and the distal surface of covering membrane 5 until the water reaches an opening 6 and contacts the wicking layer 4.

Discrete Moisture-Sensing Elements Sensors Under a Roofing Membrane

Refer to FIGS. 2G and 2H. One embodiment of a discrete moisture-sensing element assembly 99A shown rolled is isometrically depicted in FIG. 2G. The material 4A of the discrete moisture-sensing element is formed by a thin membrane of polypropylene/polyethylene (PP/PE) with a thickness $t_D$ of approximately 10 to 20 mils, or a layer of untreated (i.e., no water-repellant chemical additives) nylon 70-denier fabric with a taffeta (or other moisture-permeable) weave having a thickness of about 13 mil, or any other hydrophilic porous membrane or moisture-wicking fabric that is not a fungus nutrient. The width Y can be varied depending on the application, but in many embodiments, this dimension can be 6 to 18 inches or more. In typical variations, the moisture-sensing element 99A has discrete RFID-based sensor tags 12 adhesively applied to moisture-wicking material 4A. Distance P between the sensor tags 12 is small-enough such that any moisture that contacts the moisture-wicking material 4A is carried to nearest sensor tag 12 with a 95% probability. In many applications, distance P can be up to 36 inches; however, distance P may be varied depending on the moisture-wicking material 4A, the dimension Y, and the specific application.

In another embodiment, the RFID-based sensor tags 12 are a plurality of modified off-the-shelf tags such as the RF Micron (dba Axzon) RFM2100-AFR (see https://axzon.com/rfm2100-wireless-flexible-moisture-sensor/), which use an antenna design that acts as a tuned RLC circuit to enable the RFID tag to sense the presence of moisture. In some variations, the RFID integrated circuit (IC) chips used for sensor tags 12 are RF Micron (dba Axzon) RFM3300-D Magnus®-S3 M3D Passive Sensor IC (see https://axzon.com/rfm3300-d-magnus-s3-m3d-passive-sensor-ic/), which uses the tuned RLC antenna principle to sense moisture. In many applications, the RF Micron (dba Axzon) RFM405 Xerxes-I Sensor IC (see https://axzon.com/xerxes-i/) with analog port and encryption modes, or the AMS SL900A EPC Gen2 sensor tag and data logger IC (see https://ams.com/s1900a), can be used to enable the direct capacitive and resistance impedance measurements. These IC RFID chips use the industry-standard ISO 18000-6 UHF (see https://www.iso.org/standard/46149.html) protocol to communicate wirelessly and are powered by scavenging energy from the RFID reader so that no on-board or external power supply is required.

An embodiment of a barrier membrane 9 with a plurality of RFID-based discrete moisture-sensing elements 12 is isometrically depicted in FIG. 2I1 and is shown as partially rolled with the distal surface curled downward to show part of the distal surface of barrier membrane 9. The barrier membrane 9 can be used in roofing applications. The discrete moisture-sensing elements 12 are adhesively attached to the proximal surface of membrane 9, and then covered with a layer of wicking fabric 4 that is formed by a thin membrane of PP/PE with a thickness of approximately 10 to 20 mils, or covered with a layer of untreated (i.e., no water-repellant chemical additives) nylon 70-denier fabric with a taffeta (or other moisture-permeable) weave having a thickness of about 13 mil, or covered with any other hydrophilic porous membrane or moisture-wicking fabric that is not a fungus nutrient. The separation distances P and D between discrete moisture-sensing elements 12 are optimized to ensure that any moisture that contacts the layer of wicking fabric 4 is carried to the nearest discrete moisture-sensing element or elements 12 with a 95% confidence. The distal surface 9A of membrane 9 has a plurality of safe-to-fasten visual keep-away areas 97 stenciled or printed on distal surface 9A, that are spatially aligned with the plurality of discrete moisture-sensing elements 12 adhesively attached to the proximal surface of membrane 9. This provides visual indication to the installing contractor where not to drive a mechanical fastener through the membrane 9 during the installation process. The membrane's 9 distal surface 9A also has a plurality of barcodes 27 co-located with the plurality of safe-to-fasten visual keep-away areas 97, that encode the unique tag ID of the corresponding discrete moisture-sensing RFID-based elements 12 on the membrane 9 proximal surface, which serves to facilitate the installation topographic mapping method detailed in FIG. 5A.

FIG. 2I provides details of the integration of a plurality of the FIG. 2G RFID-based discrete moisture-sensing elements 12 into a mechanically-attached roofing-system installation. Several different roofing configurations are depicted installed over the roofing substrate 13. The systems are depicted as partially installed under roofing membrane 9 fragments for clarity, and different configurations are shown installed on the same roofing substrate 13 to convey the idea that multiple installation options are possible. It should be noted that the discrete moisture-sensing element assembly 99A of FIG. 2G are depicted cut to a short length approximately equal to dimension P of FIG. 2G and rolled out flat as items 99A1 to 99A6 in FIG. 2I.

Vapor retarder/barrier membrane fragment 98 is depicted as installed immediately over roofing substrate 13 in FIG. 2I. Discrete moisture-sensing element assembly 12, 99A1 is adhesively attached to membrane fragment 98. The discrete moisture-sensing-element assembly 12, 99A1 is useful in detecting the movement of water vapor from the building structure into the roofing system either from construction-generated moisture or from the movement of cooler interior air-conditioned air.

FIG. 2I shows fan-fold thermal insulation panel 8B installed over vapor retarder/barrier membrane fragment 98, with opposing fold seams 8B1, 8B2, and over moisture-sensing-element assembly 12, 99A2. The fan-fold thermal-insulation panel 8B material is typically a closed-cell polyisocyanurate foam (simply referred as 'polyiso' in the roofing trade) but can also be any panel that is acceptable to the membrane manufacturer with thermal-insulating properties. Another discrete moisture-sensing element assembly 12, 99A3 is installed above fan-fold thermal-insulation panel 8B using a mild adhesive (not shown). It should be noted that the moisture-sensing-element assemblies 12, 99A2; 12, 99A3 can also be factory-integrated into fan-fold thermal-insulation panels 8B. The location and orientation shown for each of the moisture-sensing-element assemblies 12, 99A2; 12, 99A3 is provided for reference purposes only because moisture-sensing-element assemblies 12, 99A2; 12, 99A3 can be installed in many different locations and orientations above fan-fold thermal-insulation panel 8B. If fan-fold thermal-insulation panel 8B is metal-foil backed, then moisture-sensing-element assembly 12, 99A1 cannot be installed below fan-fold thermal-insulation panel 8B and instead, moisture-sensing-element assemblies can only be installed above fan-fold thermal insulation panel 8B as depicted by 12, 99A2 and 12, 99A3. By knowing how the single-ply roofing membrane 9 will be placed, the various moisture-sensing-element assemblies 12A, 99A3; 12B, 99B can be oriented to avoid penetration of the RFID-based sensor tags 12A, 12B by the mechanical fasteners (not shown) used to attach single-ply roofing membrane fragments 9 that are applied along the seam between roofing membrane fragments 9 and covered by single-ply roofing membrane battening strip 11, or oriented to avoid proximity to heat-welded seams 10. Fan-fold thermal-insulation panel 8B is depicted as placed under single-ply membrane 9 with heat-welded seams 10, but, in variations, the fan-fold thermal-insulation panel 8B can also be placed under single-ply membrane 9 with a battening strip 11 over the seam, which is not explicitly depicted in FIG. 2I.

Thermal-insulation panels 8A are depicted as installed over vapor retarder/barrier membrane fragment 98 in FIG. 2I. The material for thermal-insulation panels 8A can be extruded polystyrene (XPS) or expanded polystyrene (EPS) closed-cell foams, or other acceptable materials with thermal and/or acoustical insulating properties. A discrete moisture-sensing element assembly 12, 99A5 is depicted as installed above thermal-insulation panels 8A using a mild adhesive (not shown). It should be noted that the moisture-sensing-element assembly 12, 99A5 can also be factory-integrated into the thermal-insulation panels 8A. The location and orientation provided for the moisture-sensing-element assembly 12, 99A5 is shown for reference purposes only because the moisture-sensing-element assembly 12, 99A5 can be installed in many different locations and orientations above the thermal-insulation panels 8A. Slip-sheet fragment 100 is depicted as installed over the thermal-insulation panels 8A. The slip-sheet layer 100 can be used to achieve separation and cushioning between the thermal-insulation panels 8A and the single-ply roofing membranes 9, shown as fragments in FIG. 2I. Slip sheets 100 can be comprised of a non-woven polyester material or any other material with similar mechanical properties. A discrete moisture-sensing-element assembly 12, 99A6 is installed above slip sheet fragment 100 using a mild adhesive (not shown). Another discrete moisture-sensing-element assembly 12, 99A4 is installed above slip sheet fragment 100 with sensing element 12 depicted below membrane fragment 9. In some variations, to eliminate the separate wicking strip 4A from the sensor assembly 99A of FIG. 2G, the moisture-sensor tags 12 can also be factory-integrated directly onto the slip sheet 100; however, in such variations, the material of slip sheet 100 will require treatment using vacuum ionic plasma to impart hydrophilic properties to slip sheet 100, and also the quantity and separation between sensor tags 12 will require modification from the configurations shown in FIGS. 2G and 2I1 because of the differences in the water transport properties of hydrophilic slip sheet 100 and FIG. 2G wicking material 4A. The location and orientation provided for the moisture-sensing-element assemblies 12, 99A4; 12, 99A6 is provided for reference purposes only since moisture-sensing-element assemblies 12, 99A4; 12, 99A6 can be installed in many different locations and orientations above slip sheet fragment 100. By knowing how the single-ply roofing membrane 9 will be placed, the various moisture-sensing-element assemblies 12, 99A4; 12, 99A5; 12, 99A6 can be oriented to avoid penetration of the RFID-based sensor elements 12 by mechanical fasteners (not shown) used to attach single-ply roofing-membrane fragments 9 applied along the seam between roofing-membrane fragments 9 and covered by a single-ply roofing-membrane-battening strip 11. Thermal-insulation panels 8A are depicted as placed under single-ply membrane 9 with battening strip 11 installed over seams; however, the thermal-insulation panel 8A can also be placed under single-ply membrane 9 with heat-welded seams 10, which is not explicitly depicted in FIG. 2I.

FIG. 2J depicts several configurations of installed envelope-protection systems on the horizontal surfaces of a notional structure. A corner of the structure is represented by vertical datum 95, and an upper edge of the structural foundation is represented by horizontal datum 95A, both of which serve to facilitate the installation topographic-mapping method detailed in FIGS. 5A and 4G. As shown in FIG. 2J, a roofing installation is depicted by single-ply membrane 9 with a plurality of moisture-sensor-elements 12 and safe-to-fasten visual keep-away zones 97 and barcodes 27A stenciled onto the distal surface of single-ply membrane 9. The details of the roofing installation are revealed in the descriptions for FIG. 2I1 and FIG. 2I above and some variations can also incorporate a plurality of installed moisture-sensing element assemblies 99A as described in FIG. 2G.

A decking installation is depicted in FIG. 2J by membrane 90 having a plurality of moisture-sensing elements 12 and safe-to-fasten visual keep-away zones 97, with barcodes 27A stenciled onto the distal surface of membrane 90. The details of the installation are revealed in the above descriptions for the membrane of FIG. 2I1 and, in some variations, can also incorporate a plurality of installed moisture-sensing element assemblies 99A as described above in FIG. 2G.

Installation Configurations of the Improved Moisture-Sensing Roofing Membrane

Refer now to FIGS. 2A, 2B, 2C, 2D, 2E, and 2F. FIG. 2A isometrically depicts a notional single-ply roofing installation with other embodiments of the composite improved moisture-sensing roofing membrane 1A, 1B, 1C. For comparative purposes, the FIG. 2A illustration is intended to merely convey several possible embodiments of a single-ply roofing installation with different embodiments of the integrated composite improved moisture-sensing roofing membrane 1A, 1B, 1C. In actual installations, only one or possibly two different embodiments is expected to be used within a single roofing installation.

Here, an underlayment 8 is depicted as installed over the structural substrate 13 of the roof. In many applications, the underlayment 8 can be a rigid board insulation, but the underlayment 8 can also vary depending on the roofing system and installation specifications for each job. Four different applications of single-ply roofing membranes 9, 9A, 9A1 with width $w_2$ are shown applied over several embodiments of improved moisture-sensing roofing membrane 1A, 1B, 1C, which can have heat-welded overlaps 10 or can have heat-cured seam cover 11. In these embodiments, the improved moisture-sensing roofing membrane 1A, 1B, 1C and single-ply roofing membrane 9, 9A, 9A1 can have identical widths $w_2$ and the upper roofing membrane 9 and lower improved roofing membranes 1A, 1B, 1C are shown aligned within the notional installations. During installation, the underlying improved moisture-sensing roofing membranes 1A, 1B, 1C are aligned longitudinally with the single-ply roofing membranes 9, 9A, 9A1. Typical widths $w_2$ for single-ply roofing membranes 9, 9A, 9A1 are 78-120 inches; however, this width will vary from manufacturer to manufacturer.

Several wireless RFID tags 12A, 12B, 12C, 12D are notionally depicted as installed immediately below single-ply roofing membrane 9, 9A, 9A1 and these can be located at the center of the longitudinal axis of the single-ply roofing membranes 9, 9A, 9A1 at dimension $d_1$, which can be equally distant from the longitudinal edges of the two sets of membranes 1A, 1B, 1C, 1D and 9, 9A, 9A1 (note that $d_1$ can be one-half of w2), although dimension $d_1$ can also vary depending on the single-ply roofing membrane 9, 9A, 9A1 configurations, the moisture-sensing roofing membranes 1A, 1B, 1C configurations, and the particular aspects of each individual roofing-system installation. Normally, wireless RFID tags 12A, 12B, 12C, 12D are installed as far as possible from the single-ply membrane 9, 9A weld seams 10 that are created during roofing installation, and/or from single-ply membrane 9A1, 9A seam covers 11 that are heat-cured during roofing installation. It should be noted that the weld seams 10 typically can have overlaps of 1.5 inches or greater, but these overlaps can also vary based on membrane manufacturer installation requirements and guidelines. Wireless RFID tags 12A, 12C are depicted as exposed with single-ply roofing membrane 9, 9A removed, and wireless RFID tag 12D is depicted as being below single-ply roofing membrane 9A1, as denoted by the 12D dashed line, while wireless RFID tag 12C1 depicts a location below single-ply roofing membrane 9A where wireless RFID tag 12B, placed above single-ply roofing membrane 9, is electrically connected to the lower improved roofing membrane 1B. The wireless RFID tags 12A, 12B, 12C, 12D are typically the approximate size and thickness of a credit card but can also be made larger for roofing applications to increase the reading range, since there would be less restrictions on the physical size of RFID tags.

The longitudinal separation between wireless RFID tags 12A, 12B, 12C, 12D is typically dictated by the longitudinal placement of sensing areas 7, 7A, 7B where one wireless RFID tag 12A, 12B, 12C, 12D is connected to an appropriate sensing area 7, 7A, 7B, or appropriate pairs of sensing areas 7, 7A, 7B depending on the embodiment of the improved moisture-sensing roofing membrane 1A, 1B. The wireless RFID tags 12A, 12B, 12C, 12D can be electrically connected using an electrically conductive adhesive such as, for example, Permabond® 820, with an electrical conductivity of >1×10E7 (m/ohm), a dielectric strength of 25 kV/mm, and a service temperature range of −55° C. to +200° C. (−65° F. to +390° F.). Considerations for the environmental conditions that the wireless RFID tags 12A, 12B, 12C, 12D may be subjected to in roofing applications have been made. The electronic chips within wireless RFID tags 12A, 12B, 12C, 12D can have an automotive-grade-temperature operating range between −40° C. and +125° C. (−40° F. and +257° F.) and will have a non-operating-temperature range between −65° C. and +150° C. (−85° F. and +302° F.). Because the wireless RFID tags 12A, 12B, 12C, 12D are passive devices, they will only operate for approximately 10 to 50 milliseconds when a reading request is sent to initiate measurement of the wicking layer 4 capacitance. In some variations, the wireless RFID tags 12A, 12B, 12C, 12D chips can also have a lead-temperature absolute maximum rating of +260° C. (500° F.) for 10 seconds, which normally occurs during wave-soldering of the chips to circuit boards during production. The 10-second maximum rating also serves to protect the wireless RFID tags 12A, 12B, 12C, 12D during the heat-welding and heat-curing operations that will occur during roof installation. Thermal surveys of roofing, under worse-case conditions, have shown that roofing reaches temperatures of up to +170° F. (~+77° C.) from solar heating (see, e.g., Winandy, et al., "Roof Temperatures in Simulated Attics", US Department of Agriculture, Forest Service Laboratory Research Paper, September 1995).

In the two right-most installations depicted in FIGS. 2A and 2A-1, one embodiment of improved moisture-sensing roofing membrane 1A is shown with base membrane 2 and metalized coating 3 with wicking layer 4 and sensing areas 3A, 7 composed of sensing membrane 7A with metalized coating 3A and are depicted as large square squares of width $w_3$ and set back from the edge of the improved moisture-sensing roofing membrane 1A of distance $d_3$. Distance $d_3$ is typically between 4 and 6 inches, but can vary depending on the configuration, while width $w_3$ may be twice distance $d_3$ less than width $w_2$. Width $w_{3a}$, shown more-clearly in FIG. 2A-1, depicts the boundary distance between the outer edge of metalized coating 3A and the edge of sensing membrane 7A. Width $w_{3a}$ is typically approximately 1 inch and can be wide-enough to provide electrical insulation between the wicking membrane 4 and the metalized coating 3A to prevent moisture-created resistive short-circuits between adjacent sensing areas 3A, 7 during biplanar capacitance measurements, or between sensing areas 3A, 7 and the metalized coating 3 of base membrane 2 during coplanar capacitance measurements. Covering layer 5A is depicted as a fragment partially removed, and the proximal surface of covering layer 5A can be adhered to the distal surface of sensing areas 3A, 7 for mechanical attachment and to ensure electrical insulation between the sensing areas metalized coating 3A and wicking layer 4 as described previously. Covering layer 5A is depicted with a plurality of circular openings 6A that allow leakage moisture to contact wicking layer 4 more easily but as stated previously, the shape, quantity, and arrangement of the plurality of openings 6A can vary depending on the configuration of improved moisture-sensing roofing membrane 1A. The plurality of openings 6A can be of small area (<1 SQI) to preclude the possibility of distorting the single-ply roofing membrane 9. The single-ply roofing membrane 9 can be installed directly over improved moisture-sensing roofing membrane 1A, with the proximal surface of single-ply roofing membrane 9 contacting the distal surface of covering layer 5A, as depicted in FIG. 2D. Wireless RFID tag 12A is installed between the metalized coating 3A of sensing membrane 7A within covering layer 5A sensor opening 6A1 immediately below the single-ply roofing membrane 9 and can be located at the center of the longitudinal axis of the single-ply roofing membrane 9 as described previously. Each sensing area 3A, 7 is separated by distance $d_{2a}$ along the longitudinal axis of improved moisture-sensing roofing membrane 1A, where distance $d_{2a}$ is typically between 1 and 2 inches. The advantage of the improved moisture-sensing roofing membrane embodiment 1A is that it can provide a simple operation to electrically connect and adhere a plurality of wireless RFID tags 12A on the installation job, or the configuration can facilitate factory integration of a plurality of wireless RFID tags 12A within the improved moisture-sensing roofing membrane 1A.

In the center-left installation depicted in FIG. 2A, another embodiment of the improved moisture-sensing roofing membrane 1B is the equivalent to the improved moisture-sensing roofing membrane 1 depicted in FIGS. 1A, 1B, and 1C. Single-ply roofing membrane 9A is installed over the covering layer 5B with a plurality of openings 6B of improved moisture-sensing roofing membrane 1B, with the proximal surface of single-ply roofing membrane 9A contacting the distal surface of covering layer 5B, as depicted in FIG. 2C. The plurality of openings 6B can be of small area (e.g., <1 SQI) to preclude the possibility of distorting the single-ply roofing membrane 9A. Wireless RFID tag 12C is installed into covering layer 5B immediately below single-ply roofing membrane 9A within covering layer 5 opening 6B1 and can be electrically connected between sensing areas 7B below covering layer 5B, with the distance between sensing areas 7B depicted as dashed lines separated by distance $d_2$ along the longitudinal axis of improved moisture-sensing roofing membrane 1B, where distance $d_2$ is typically between 1 and 2 inches. The single-ply roofing membrane 9A can have a plurality of safe-to-fasten visual indicators 6B3 stenciled onto the distal surface of the membrane that shows where a mechanical fastener can safely be driven through the improved moisture-sensing roofing membrane 1B, as indicated by covering layer 5B plurality of openings 6B2. Openings 6B2 is typically approximately 1 inch in diameter, but also can vary in size and arrangement depending on the configuration of improved moisture-sensing roofing membrane 1B. The plurality of openings 6B2 can also be aligned with openings areas of the electrical coating (not explicitly shown, but similar to sensing area 3A) of sensing membrane 7B as well as the electrical coating 3 on base membrane 2 in the improved moisture-sensing roofing membrane 1C (i.e., the associated sensing and base membranes themselves may not have physical openings). This feature allows a mechanical fastener to pass through improved moisture-sensing roofing membrane 1B without compromising the electrical characteristics of the capacitive-sensing devices within improved moisture-sensing roofing membrane 1B. Improved moisture-sensing roofing membrane embodiment 1C provides a robust protective layer for sensing areas 7B and wicking layer 4. Additionally, the operation to electrically connect and adhere a plurality of wireless RFID tags 12C can be performed during the installation job, or the configuration can facilitate factory integration of a plurality of wireless RFID tag 12C within the improved moisture-sensing roofing membrane 1C.

Wireless RFID tag 12B is notionally depicted as placed above single-ply roofing membrane 9 in the center-right installation of improved moisture-sensing roofing membrane 1A depicted in FIG. 2A and can be interfaced via electrical connection 14 to area 12C1 under the single-ply roofing membrane 9A installed over improved moisture-sensing roofing membrane 1B. The single-ply roofing membrane patch 11A, shown transparent for purposes of clarity, is placed over wireless RFID tag 12B and electrical connection 14 to serve as post-installation protection. The single-ply roofing membrane patch 11A can be adhesively secured but can also/alternatively be heat-welded and cured given the proper configuration. Electrical connection 14 is passed through the heat-welded overlap seam 10 and is subjected to the higher-temperatures of the heat-curing process. In variations, the electrical connection 14 is a flat set of electrically-conductive traces within a protective high-temperature film carrier such as Kapton (polyimide film), which remains stable across the temperature range of −452° F. to 752° F. To ensure a non-compromised heat-weld seam, electrical connection 14 requires a factory-applied thermoplastic coating over the polyimide film to facilitate the thermal weld. Additionally, due to the high-temperature of the air discharged by thermoplastic heat-welding machines (between approximately 650° F. and 1100° F., depending on membrane type, membrane thickness and weather conditions), it may be necessary to place a temporary protective heat shield over the exposed length of electrical connection 14 and wireless RFID tag 12B during the welding process.

In the leftmost installation depicted in FIG. 2A, another embodiment of improved moisture-sensing roofing membrane 1D is shown with base membrane 2 and metalized coating 3 along with wicking layer 4 and metalized sensing elements 7C1, 7C2 of width $w_4$ and separated by distance $d_4$. No covering layer 5 is shown, and instead an upper wicking layer 4C, depicted as a fragment, can be installed over the distal surfaces of wicking layer 4 and metalized sensing elements 7C1, 7C2. The single-ply roofing membrane 9A1 can be installed directly over improved moisture-sensing roofing membrane 1C with the proximal surface of single-ply roofing membrane 9A1 contacting the distal surface of upper wicking layer 4C, as depicted in FIG. 2B. Except for planar-dimensions and no external boundary width between the metalized coating and the edge of the carrier membrane, metalized sensing elements 7C1, 7C2 can have the same mechanical configuration as described for the sensing areas in FIG. 1A.

In variations, a plurality of groups of metalized sensing elements 7C1, 7C2 can be arranged along the longitudinal axis of improved moisture-sensing roofing membrane 1D in a similar fashion as described for improved moisture-sensing roofing membranes 1A, 1B, and each group of longitudinally-arranged metalized sensing elements 7C1, 7C2 can each have its own wireless RFID tag 12D electrically connected between metalized sensing element 7C1 and metalized sensing element 7C2 within each sensing area group. Within each group of C1 and C2 pairs, metalized sensing elements 7C1 are electrically connected to all C1 elements and metalized sensing elements 7C2 are electrically connected to all C2 elements. Metalized sensing elements 7C1, 7C2 measures the electrical impedance between each C1 and C2 pair of sensing areas 7C1, 7C2. Distance $d_4$ is typically between ½ and 1 inches, but distance $d_4$ can vary depending on the configuration, while width $w_4$ can be variable depending on how much sensing length between C1 and C2 pairs is required to reliability sense the presence of moisture in wicking layer 4. A reduced $w_4$ dimension can imply more C1 and C2 pairs per group of metalized sensing elements 7C1, 7C2, thereby increasing the sensing length between C1 and C2 pairs within each group, which serves to increase the electrical sensitivity of the electrical-impedance measurement.

Upper wicking layer 4C can be adhesively or friction-welded as described previously for FIG. 1A. Wireless RFID tag 12D can be factory-installed under upper wicking layer 4C and can be located at the center of the longitudinal axis of the single-ply roofing membrane 9A1, as described above. It should be noted that in practice, a factory-installed wireless RFID tag 12D is placed with the longest tag dimension aligned with the transverse axis of the improved moisture-sensing roofing membrane 1C, with the tag dimension aligned with the longitudinal axis of the improved moisture-sensing roofing membrane 1C engineered to be as short (<½ inch) as possible, which facilitates rolling the membrane 9A1 for storage and shipment. Safe-to-fasten visual indicator line 6C, which is stenciled onto the distal surface of single-ply roofing membrane 9A1, is intended to indicate where it would be safe to drive fasteners through the single-ply roofing membrane 9A1 and through the improved moisture-sensing roofing membrane 1C into the underlayment 8. The safe-to-fasten visual indicator line 6C is typically setback from the edges of single-ply roofing membrane 9A1 and its various embodiments by a distance slightly less than distance $d_3$, where the metalized sensing elements 7C1, 7C2 and possibly the metalized coating 3 on base membrane 2 may not be present. The setback distance is approximately ½ inch, but can vary depending on the configuration of improved moisture-sensing roofing membrane 1C. The FIG. 2A embodiments of improved moisture-sensing roofing membrane 1C are intended to illustrate an impedance-based moisture-sensing detection mechanism that is different from the capacitive-based moisture measurements depicted above.

FIG. 2E depicts an isometric cross-sectional view of the FIG. 2A embodiment in the location Detail CC' that shows how single-ply roofing membranes 9 and 9A can be overlapped with improved moisture-sensing roofing membrane 1, 1D below the roofing membranes single-ply roofing membranes 9, 9A. Notably, the C'-side of the FIG. 2A Detail CC' appears on the left in FIG. 2E; therefore, the perspective of the FIG. 2E illustration looks back out of the page within the FIG. 2A illustration. Also, the embodiment of improved moisture-sensing roofing membrane 1D depicted on the right side (C-side of Detail CC') of FIG. 2E differs from the improved moisture-sensing roofing membrane 1C embodiment depicted in FIG. 2A. The single-ply roofing membrane 9 is applied over improved moisture-sensing roofing membrane 1, which are both installed over underlayment 8. Notably, a heat-shield layer 26, which may be formed from a 4-mil thick BoPET membrane, is notionally shown as installed between single-ply roofing membrane 9 and improved moisture-sensing roofing membrane 1, which may also apply to the various installation embodiments 1A, 1B, 1C of improved moisture-sensing roofing membrane 1. The single-ply roofing membrane 9A can be applied over the improved moisture-sensing roofing membrane 1D, which are both installed over underlayment 8. In variations, the depicted embodiment of the improved moisture-sensing roofing membrane 1D can have reinforcing scaffolding 25 within wicking layer 4, which may be necessary to strengthen the bond between the base membrane 2 and covering membrane 5, if the single-ply roofing membrane 9A is adhesively-adhered. For good adhesion, adhesively-applied single-ply roofing membranes 9A are typically fleece-backed on their proximal surfaces and this configuration is also applied for the improved moisture-sensing roofing membrane 1D, which can also be adhesively applied to the underlayment 8.

For wicking layers 4 formed from hydrophilic polymer or fluoropolymer membranes, the reinforcing scaffolding 25 can be formed from solid sections of the same polymer or fluoropolymer materials, and for wicking layers 4 formed from untreated nylon fabrics, the fabric can have a ripstop weave, with a network of reinforcing higher-denier nylon mesh. Single-ply roofing membrane 9A can be overlapped with single-ply roofing membrane 9 by distance $d_5$ and is typically heat-welded 21 along weld seam 10. Distance $d_5$ is typically 1.5 inches minimum, but can be as much as 5 inches depending on the thickness of the single-ply roofing membrane 9, 9A and the manufacturer's installation requirements and specifications. The left edge of improved moisture-sensing roofing membrane 1D can also be setback from the left edge of single-ply roofing membrane 9A by approximately distance $d_5$ by about 0.25 to 1.0 additional inches, again depending on the single-ply roofing membrane 9, 9A membrane thickness.

FIG. 2E illustration depicts two different embodiments of the improved moisture-sensing roofing membrane 1, 1D: embodiment 1D under single-ply roofing membrane 9A, and embodiment 1 under single-ply roofing membrane 9. Typically, only one embodiment of each type of membrane; that is, 1 or 1A, and 9 or 9A; would be used in a single roofing installation. Two embodiments depicted in FIG. 2E are provided for notional purposes only to show different configurations within the same illustration. Notably, the configurations represented by the embodiments depicted in FIG. 2E can also apply to an integrated single-ply and improved moisture-sensing roofing membrane, in which each type of membrane 9A and 1D is factory-integrated, and can include pre-installed wireless RFID tags 12, 12A, 12B, 12C and/or connection wiring 14. This composite embodiment of an improved single-ply roofing membrane with integrated moisture-sensing offers a much-simplified, single-ply, roofing system installation, which also results in a reduction or elimination of mistakes during the installation process.

Wireless RFID tag 12B is depicted as installed on the distal surface of single-ply roofing membrane 9 and can be interfaced via electrical connection 14 to the sensing membrane 7, metalized coating 3A, and metalized coating 3 of based membrane 2 within the improved moisture-sensing roofing membrane 1D installed under single-ply roofing membrane 9A. The single-ply roofing membrane patch 11A can be placed over wireless RFID tag 12B and electrical connection 14 to serve as post-installation protection for the roofing system. The single-ply roofing membrane patch 11A can be adhesively secured, but also can be heat-welded and/or cured given the proper configuration. The edges of single-ply roofing membrane patch 11A may then be detailed with roofing adhesive 24. If the electrical connection 14 is passed through the heat-welded overlap seam 10, it is therefore is subjected to the higher-temperatures of the heat-welding and/or curing process. As previously described for FIG. 2A, electrical connection 14 can be a flat set of electrically-conductive traces within a protective high-temperature film carrier such as Kapton (polyimide film), which remains stable across the temperature range of −452° F. to 752° F. To ensure a non-compromised heat-weld seam, electrical connection 14 may require a factory-applied thermoplastic coating over the polyimide film to facilitate the thermal weld. Additionally, depending on the membrane type, the membrane thickness, and the weather conditions, high-temperature air between approximately 650° F. and 1100° F. may be discharged by thermoplastic heat-welding machines; therefore, it may be necessary to place a temporary protective heat shield over the exposed length of electrical connection 14 and wireless RFID tag 12B during the welding process.

To improve wireless communication range, the external attachment embodiment of wireless RFID tag 12B might be necessary for single-ply roofing installations with an overburden layer (not shown). Additionally, wireless RFID tag 12B can be placed on an enclosed pedestal formed from a polymer material (not shown) to raise the wireless RFID tag 12B nearer to the distal surface of the overburden layer. To clear the tag from metal material that would block radio-frequency signals, the external attachment embodiment of wireless RFID tag 12B might also be necessary for metal roofing and possible ethylene propylene diene monomer rubber (EDPM) single-ply membranes due to the carbon filling that makes the EDPM membranes slightly conductive. Finally, for built-up roofing systems with multiple layers, or if an improved moisture-sensing roofing membrane 1 (and its various embodiments) is used above a vapor barrier layer—typically placed below underlayment 8 directly upon the surface of the roofing substrate 13—within a roofing installation, the external attachment embodiment of wireless RFID tag 12B might also be necessary.

FIG. 2F depicts a notional configuration for a wicking layer 4A with reinforcing scaffolding 25A that may provide a higher mechanical strength. Reinforcing scaffolding 25A can be formed from a plurality of solid sections as shown by arrow y2 and can be fabricated of the same polymer or fluoropolymer materials used for the plurality of hydrophilic sections defined between arrows y1. The configuration shown in FIG. 2F is a just a notional representation; that is, the configuration of the scaffolding 25A and hydrophilic sections can vary depending on the mechanical strength required and/or manufacturability of wicking layer 4A.

Electrical Configurations of the Improved Moisture-Sensing Roofing Membrane

Refer to FIGS. 3A, 3B, 3C, 3D, 3E, and 3F. For purposes of the descriptions in this section related to the electrical configurations, wireless RFID tags in their various embodiments 12, 12A, 12B, 12C, 12D are referred to as wireless RFID tags (various embodiments). Unless a specific embodiment is addressed, this reference method will also be applied to other embodiments that are common to the electrical configuration, such as the single-ply roofing membranes 9, 9A, 9A1 and improved moisture-sensing roofing membranes 1, 1A, 1B, 1D that use capacitance to detect moisture.

FIG. 3A depicts an electrical block-diagram for the FIG. 2A embodiment 1A of the improved moisture-sensing membrane. Dashed line R denotes the components within the improved moisture-sensing membrane 1A. Four sensing areas 7A/3A, each with width $w_5$ and separated by distance $d_2$, are shown arranged along the longitudinal axis of the improved moisture-sensing membrane 1A, but an actual membrane may have a plurality of sensing areas 7A/3A, with the quantity depending on the width $w_5$, distance $d_2$, and the longitudinal length of the improved composite moisture-sensing membrane 1A. Notionally, each sensing area 7A/3A may have widths $w_3$ and $w_5$ that are equal (i.e., the area of sensing areas 7A are square shaped). Each of sensing areas a, b, c, and d (7A/3A) may have a corresponding external capacitance measurement device Va, Vb, Vc, Vd representing the wireless RFID tags (various embodiments) may be connected via electrical interface wiring 14a, 14b, 14c, 14d. The signal ground shown in FIG. 3A denotes the electrical node that is common to the external measurement devices Va, Vb, Vc, Vd from which all measurement currents return to the source (i.e., the current return path for measurement devices Va, Vb, Vc, Vd). Biplanar capacitance exists between each sensing area 7A/3A and the metalized coating 3 of base membrane 2 across the thickness or opposite surfaces of wicking layer 4, while coplanar capacitance exists between pairs of sensing areas 7A/3A on the same plane or surface of wicking layer 4. Biplanar capacitance may yield a capacitance change when wicking layer 4 absorbs moisture and may also be sensitive to a change in thickness $t_c$ (i.e., biplanar separation) between the sensing areas 7A/3A and the metalized coating 3 of base membrane 2. The change in biplanar separation may be caused by a force applied to the distal surface of single-ply roofing membrane (various embodiments), such as from snow loading. Coplanar capacitance may yield a smaller value of capacitance and still experience a large capacitance change when wicking layer 4 absorbs moisture, but may also be insensitive to a change in biplanar separation between the sensing areas 7A/3A and the metalized coating layer 3 of base membrane 2. This difference in biplanar sensitivity can be exploited to infer the mechanical loading above the single-ply roofing membrane (various embodiments) and with both coplanar and biplanar sensing elements 7A/3A within the same membrane; that is, loading and moisture components of the measured data can be separated. Notably, the 1D embodiment of improved moisture-sensing membrane depicted in FIG. 2E may be less sensitive to changes in biplanar capacitance because of the structural scaffolding 25.

FIG. 3B depicts an electrical schematic diagram of the FIG. 3A block diagram with biplanar capacitances Ca, Cb, Cc, Cd and coplanar capacitances ab, bc, and cd added. Impedances Zatst, Zbtst1, Zbtst2, Zctst1, Zctst2, Zdtst1, and Zdtst2 represent test loads that are present within the wireless RFID tags (various embodiments) that allows the wireless RFID tags (various embodiments) to perform self-testing. Impedances Zatst, Zbtst2, Zctst2, and Zdtst2 correspond to test loads for biplanar capacitances Ca, Cb, Cc, and Cd, while impedances Zbtst1, Zctst1, and Zdtst1 correspond to test loads for coplanar capacitances ab, bc, and cd. The test impedances can be located outside of the improved moisture-sensing membrane 1A as denoted by dashed line R and can be part of the external measurement devices Va, Vb, Vc, Vd. Electrical interface wiring 14a, 14b, 14c, 14d are represented by the indicated encircling loops that designate a wiring harness. The electrical interface wiring 14a, 14b, 14c, 14d can have the same mechanical configuration previously described for FIGS. 2A and 2E. The signal ground shown in FIG. 3B denotes the electrical node that is common to the external measurement devices Va, Vb, Vc, Vd from which all measurement currents return to the source (i.e., the current return path for the external measurement devices Va, Vb, Vc, Vd).

FIG. 3C depicts an electrical schematic diagram of a biplanar capacitance measurement, where $V_{measure}$ represents time-varying AC voltage Vz applied by the wireless RFID tag (various embodiments) and Iz represents the displacement current flowing through the biplanar capacitance $C_{biplanar}$ and resistance from water $R_{water}$. It is important to note that the mechanical configuration of the polymer or fluoropolymer layer, which the distal surfaces are metalized to form sensing areas 7A/3A, provides an electrical insulation layer against the tendency for water to electrically short the biplanar capacitance $C_{biplanar}$ measurement as described for embodiment 1A of improved moisture-sensing roofing membrane as depicted in FIG. 2A. This can make the biplanar capacitance $C_{biplanar}$ measurement insensitive to low resistivity within the wicking layer 4 that may result from the introduction of moisture. It should be noted that the metalized sensing elements 7C1, 7C2 of embodiment 1C of improved moisture-sensing roofing membrane as depicted in FIG. 2A can be sensitive to low resistivity within the wicking layers 4 and 4C that may result from the introduction of moisture, which is intentional since embodiment 1C is designed to detect the presence of water primarily through the resistive component of impedance.

or fluoropolymer layer, of which the distal surfaces are metalized to form sensing areas 7A, provides an electrical-insulation layer against the tendency for water to electrically short the coplanar capacitance $C_{coplanar}$ measurement; however, the metalized coating of sensing area 7 may also require an electrically-insulating cover, such as that provided by covering membrane 5 (see, e.g., FIGS. 2A through 2E). In such cases, the coplanar capacitance $C_{coplanar}$ measurement might be less sensitive to low resistivity within the wicking layer 4 that could result from the introduction of moisture.

Rectangular coplanar capacitance $C_{cp}$ in Farads is defined as shown in Equation [2]:

$$C_{cp}(s) = \begin{cases} \dfrac{\varepsilon_r l \ln\left(-\dfrac{2}{4\sqrt{\dfrac{d^2}{(d+2w)^2}-1}}\left(4\sqrt{1-\dfrac{d^2}{(d+2w)^2}}+1\right)\right)}{377\pi v_o}, & \text{for } 0 < \dfrac{d}{d+2w} \leq \dfrac{1}{\sqrt{2}} \\ \dfrac{\varepsilon_r l}{120 v_o \ln\left(-\dfrac{2}{\sqrt{\dfrac{d}{d+2w}}-1}\left(\sqrt{\dfrac{d}{d+2w}}+1\right)\right)}, & \text{for } \dfrac{1}{\sqrt{2}} < \dfrac{d}{d+2w} \leq 1 \end{cases} \quad \text{Equation [2]}$$

Rectangular biplanar capacitance $C_{bp}$ in Farads is defined as shown in Equation [1] below:

$$C_{bp} = \frac{\varepsilon_0 \varepsilon_r w l}{t} \quad \text{Equation [1]}$$

where $w_5=l=w$ (for a square) and $t_c=t$ (wicking layer 4 thickness)

where: permittivity $\varepsilon=\varepsilon_0\varepsilon_r$ and permeability $\mu=\mu_0$ and $d_2=d$ and $w_5=l=w$ (for a square) and all distance dimensions are in meters. (See Clayton R. Paul, "Analysis of Multiconductor Transmission Lines," 2nd Ed., 2008)

TABLE 1

Biplanar Capacitance Values With Moisture-Sensing Membrane Parameters

| $w_2$ (inches) | $w_5$ (inches) | $t_c$ (mils) | $\varepsilon_r$ dry | $\varepsilon_r$ wet | $C_{bp}$ (Farads) dry | $C_{bp}$ (Farads) wet | Capacitance increase dry to wet |
|---|---|---|---|---|---|---|---|
| 78 | 72 | 10 | 2 | 60 | 2.33 × 10E–7 | 6.99 × 10E–6 | ×30 |
| 120 | 114 | 10 | 2 | 60 | 5.84 × 10E–7 | 1.75 × 10E–5 | ×30 |
| 78 | 72 | 20 | 2 | 60 | 1.16 × 10E–7 | 3.49 × 10E–6 | ×30 |
| 120 | 114 | 20 | 2 | 60 | 2.92 × 10E–7 | 8.76 × 10E–6 | ×30 |

For the calculations in Table 1, the percent fill of wicking layer 4 was set to 25%, which yielded an $\varepsilon_r$ wet value of 60 with $\varepsilon_r$ water=80.2. The difference in biplanar capacitance is approximately 30 times between a completely dry and fully saturated wet wicking layer 4. This large change in biplanar capacitance between dry and wet conditions provides very good electrical measurement sensitivity for detecting the presence of moisture in wicking layer 4.

FIG. 3D depicts an electrical schematic diagram of a coplanar capacitance measurement, where $V_{measure}$ represents time-varying AC voltage Vz applied by the wireless RFID tag (various embodiments) and Iz represents the displacement current flowing through the coplanar capacitance $C_{coplanar}$ and resistance from water $R_{water}$. It is important to note that the mechanical configuration of the polymer

TABLE 2

Coplanar Capacitance Values With Moisture-Sensing Membrane Parameters

| $w_2$ (inches) | $w_5$ (inches) | $d_2$ (inches) | $\varepsilon_r$ dry | $\varepsilon_r$ wet | $C_{bp}$ (Farads) dry | $C_{bp}$ (Farads) wet | Capacitance increase dry to wet |
|---|---|---|---|---|---|---|---|
| 78 | 72 | 0.5 | 2 | 60 | 1.45 × 10E–10 | 4.36 × 10E–9 | ×30 |
| 120 | 114 | 0.5 | 2 | 60 | 2.45 × 10E–10 | 7.35 × 10E–9 | ×30 |
| 78 | 72 | 1.0 | 2 | 60 | 1.31 × 10E–10 | 3.93 × 10E–9 | ×30 |
| 120 | 114 | 1.0 | 2 | 60 | 2.22 × 10E–10 | 6.67 × 10E–9 | ×30 |

For the calculations in Table 2, the percent fill of wicking layer 4 was set to 25%, which yielded an $\varepsilon_r$ wet value of 60 with $\varepsilon_r$ water=80.2. A symmetrical wicking layer above and below sensing areas 7A/3A was assumed. The difference in coplanar capacitance is approximately 30 times between a completely dry and fully saturated wet wicking layer 4. Although the coplanar capacitance levels are around three orders-of-magnitude less than the equivalent biplanar capacitance values shown in Table 1, the large change in coplanar capacitance between dry and wet conditions provides exceptionally good electrical-measurement sensitivity for detecting the presence of moisture in wicking layer 4.

FIG. 3E depicts the schematic for a generic low-pass RC filter, where Vdrive represents a drive voltage from a wireless RFID tag (various embodiments), R represents resistance, C represents capacitance, and Vcap represents the measurement of the voltage applied by Vdrive through resistance R across capacitance C. The dashed boundary Roof Mem ("roof membrane") represents what may be contained within the improved moisture-sensing roofing membrane (various embodiments). The signal ground shown in FIG. 3E represents the common voltage node where the electrical current from Vdrive returns. Resistance R can be a fixed value resistor wireless RFID tag (various embodiments), and capacitance C is the biplanar or coplanar capacitance within the improved moisture-sensing roofing membrane (various embodiments), which can vary with moisture content as described in Tables 1 and 2. The electrical RC time constant τ is altered by changes to the capacitance value C within the improved moisture-sensing roofing membrane (various embodiments).

Capacitor voltage Vcap, while charging and discharging, is defined as shown in Equation [3] below:

$$V_{cap}(t) = \begin{cases} \text{Charging,} & V_{drive}(1 - e^{-t/\tau}) \\ \text{Discharging,} & V_{drive}(e^{-t/\tau}) \end{cases} \text{Where} : \tau = RC \quad \text{Equation [3]}$$

FIG. 3F depicts the waveforms at Vcap in volts for various states of wicking layer 4 in improved moisture-sensing roofing membrane (various embodiments), where capacitance change may occur when wicking layer 4 absorbs moisture and changes the biplanar capacitance between the sensing areas 7A/3A and the metalized coating 3 of base membrane 2 or changes the coplanar capacitance between adjacent sensing areas 7A/3A. A square wave is applied by Vdrive between 0V and 3V, with period=t3−t1, $V_{drive\ high}$=t2−t1, and $V_{drive\ low}$=t3−t2. The square wave period and R are set be selected to produce the maximum difference in average voltage between the DRY and WET conditions of wicking layer 4, as represented by Vaverage3 and Vaverage1 respectively, which in turn is determined by the range of RC time constants (where C represents the improved moisture-sensing roofing membrane capacitance as determined by the difference between $\tau_3$ and $\tau_1$, again respectively).

IV. An Improved Method of Roofing Installation and Leak-Detection

This Section IV is directed to an improved method of installing a roofing system with intrinsic leak-detection capabilities for use in building structures, and an improved method of detecting and locating post-installation leaks in the roofing system. Refer to FIGS. 1A though 5I.

Installations and Methods of Use of the Improved Moisture-Sensing Roofing Membrane Refer to FIGS. 4A, 4B, 4C, 4D, 4E, and 4F. FIG. 4A depicts one embodiment of a cross-sectional view of a single-ply roofing installation with improved moisture-sensing roofing membranes 1E and 1F installed on both the flat and vertical surfaces of structural substrates 13A and 22 respectively. The various layers (2A, 3B, 4B, 7D/3A, and 5C; or 2B, 3C, 4C, 7E/3A, and 5D) correspond (respectively) to either the horizontal installation 1E or vertical installation 1F of the improved moisture-sensing roofing membrane. Wireless RFID tags 12 and 12' correspond to either the horizontal or vertical installations, respectively. Single-ply roofing membrane 9B is depicted on the horizontal installation, and single-ply roofing membrane 9C is depicted on the vertical installation, which extends over the upper surface of vertical wall 22 and is protected by covering cap 23. Underlayment 8A is horizontally-installed over structural substrate 13A below single-ply roofing membrane 9B, with spacing block 20 abutting the vertical wall 22. Distances $d_6$ represent the separation between the sensing area 7D/3A and 7E/3A and respectively, either the vertical wall 22 or horizontally, spacing block 20, and for purposes of this narrative are considered equal in length. Distance $d_6$ is approximately 3 to 4 inches, but may vary depending on the manufacturer's specifications and installation guidelines and the roofing system configuration.

The wicking layer 4B of improved moisture-sensing roofing membrane 1E absorbs any moisture that leaks past single-ply roofing membrane 9B. Wireless RFID tag 12 allows the source of roof leakage to be quickly detected and located. Single-ply membrane 1F is depicted as flashing for vertical wall 22. The overlap area can be heat-welded 21. The wicking layer 4C of improved moisture-sensing membrane 1F absorbs moisture that leaks past single-ply roofing membrane 1G, because often leakage that appears within a structure is attributed to 'roof' leakage but may actually be coming from the wall instead. Wireless RFID tag 12' allows the source of wall leakage to be quickly detected and located. Both Wireless RFID tags 12 and 12' are depicted as installed beneath single-ply roofing membranes 9B and 9C.

FIG. 4B depicts the embodiment of a cross-sectional view of the single-ply roofing installation depicted in FIG. 4A, with wireless RFID tags 12 and 12' installed under improved moisture-sensing membranes horizontally 1E and vertically 1F (refer also to FIG. 4A); that is, installed on both the horizontal/flat and vertical substrate surfaces (respectively). Several embodiments of wireless readout and data delivery methods to the cloud-application are depicted in FIG. 4B.

The wireless RFID tags 12 and 12' as well as the various embodiments of wireless RFID tags described previously, can use transceiver components that are EPC Class 1 Gen 2 ISO 18 000-6C Compliant, and can be Pb-Free, Halogen Free/BFR Free, and RoHS Compliant for environmental responsibility. Version 2 of the EPC Gen-2 standard includes built-in 128-bit data encryption that allows a proprietary reading protocol to be established (i.e., the tags described herein only communicate with RFID readers that are equipped with the proper decryption protocols). The wireless RFID tags 12 and 12' operate on the ISM (Industrial Scientific and Medical) UHF 902-928 MHz band for passive remote sensing and require no installed batteries or power sources, and instead may scavenge power from the RF (Radio Frequency) energy of the reading devices 31A, 31B, 31C, 31D and communicate back to the reader during this time using backscatter. Wireless RFID tag 12 and 12' sensory capability can include temperature and several additional sensor interfaces that are configured for the sensory application, such as measuring capacitance, currents or voltage levels. An example of an EPC sensory tag chip that can be used is the AMS SL900A, with an on-board±0.5° C. temperature measurement sensor that can read across a −40° C. to +125° C. range, as well as interfaces for up to two additional sensors external to the chip. For high-rate production, a custom-designed Application-Specific Integrated Circuit (ASIC) may be more cost effective, because the ASIC EPC sensory tag chip can be optimized for a specific application, with only the circuitry required to perform the functions needed. Generic longevity specifications for Gen-2 chips are 40 to 50 years of data retention and 100,000 write cycles. Gen-2 tags can have a read range of over 16 meters or 52 feet when using the full Effective Isotropic Radiated Power (EIRP) legally allowed on the readers by the FCC and other global regulators. Range can be effectively extended for UHF Gen-2 tags by increasing the size of the dipole antenna array. Typically, to save space, Gen-2 tags are restricted to a size that approximates a credit card, or approximately 4 inches in length, which equates to a ¼-wavelength dipole antenna. The wavelength of a 1 GHz signal is approximately 12 inches. It should be noted that 1 GHz is near the UHF 902-928 MHz band or 0.902-0.928 GHz wavelength.

Because the size restriction may not be as important for roofing membrane applications, the wireless RFID tags 12 and 12' can have full-wavelength dipole antennas, and four times (or more) the effective antenna array area over ¼-wavelength dipole antennas. This theoretically doubles the reading range to around 100 feet, because the RFID readers 31A, 31B, 31C, 31D can act as a point sources, where the reader's radiated power decreases in an inverse-square of the distance between the reader and the tag. Reading range can also be increased by placing a metalized conductive layer immediately under the installed wireless RFID tags 12 and 12', and this metalized conductive layer function can be served by sensing membranes' 7D, 7E metalized coating 3A or base membranes' 2B, 2A metalized coatings 3B, 3C. Actual reading distances may be dependent upon membrane thicknesses, the reading angles and any the presence of any roofing overburden, including water, snow, and ice, or other obstacles such as roof-installed air conditioners, stairwells, and vents. Furthermore, there is an upper limit to how large a wireless RFID tag 12 and 12' antenna can become due to parasitic impedance losses from stray capacitance and inductance that will negatively impact the ability of the RFID chip to drive the antenna signal. Therefore, each roofing-system installation requires a different approach to obtain complete reading coverage across the entire area of the roof.

FIG. 4B depicts several embodiments of methods to extract data from the roofing installation through wireless RFID tags 12 and 12'. A remotely-controlled flying drone 30 carries RFID reader 31A and can also carry a differential Global Positioning System (GPS) device 33A. Drone 30 RFID reader 31A can be used to read 32A wireless RFID tag 12 and read 32B wireless RFID tag 12' to obtain both the tag digital identification (ID) number and tag data that, depending on the embodiment, can include leakage, roof loading, and/or temperature measurements. Distance for readings 32A and 32B are dictated by the power of the RFID reader 31A, which can be limited below full EIRP due to battery-power limitations in drone 30. The limited reading range may not present a problem for drone 30 based wireless RFID tag 12 and 12' readings because the drone 30 can fly to any area of the roof. A drone 30 based wireless RFID tag 12, 12' reading method 31A is considered semi-continuous monitoring with the frequency of monitoring set by the time interval between drone 30 based surveys.

A handheld RFID reader 31B, which can also have a differential GPS device 33B, can also be used to obtain wireless RFID tag 12, 12' information as described above for the drone 30 survey method. Again, as with the drone 30 method 31B, a handheld RFID reader 31B may be limited below full EIRP due to limited battery power in the handheld device 31B. A handheld-based wireless RFID tag 12, 12' reading method 31B is also considered semi-continuous monitoring with the frequency of monitoring set by the time interval between handheld-based surveys.

A permanent fixed RFID reader 31C can also be used to obtain wireless RFID tag 12, 12' information, as described previously for the drone 30 method 31A. Distance $d_7$ between fixed RFID readers 31C can be established based on the reading range of the fixed RFID readers 31C. Unlike portable RFID readers 31A, 31B that may have limited power, a fixed RFID reader 31C may be powered locally from structure power, or from a battery pack recharged continuously with roof-top solar cells, and therefore the full EIRP can be available, which in turn allows for the maximum possible passive wireless RFID tags 12, 12' reading range. The quantity of fixed RFID readers 31C needed to provide full reading coverage is dependent on the practical RFID-reading range, the dimensions of the roofing installation, and whether any obstacles are present on the roof, as shown, for example, in FIG. 4D, item 46 (such as a chimney) and item 47 (such as a stairwell or air-conditioning unit).

In other variations, a wheeled robot 34 (or a robot on tracks) can be used to carry an RFID reader 31D that can also have a differential GPS device 33C to obtain wireless RFID tag 12, 12' information, as described previously for the drone 30 method 31A. The wheeled robot 34 may be programmed to cover specific areas and may have obstacle avoidance sensors and may have automatic recharging capability. The wheeled robot 34 may have low-durometer wheel 36 tires or treads to minimize the mechanical stress on the single-ply roofing membrane (various embodiments). Again, as with the drone 30 method 31B, a the RFID reader 31D may be limited below full EIRP due to limited battery power in the robotic device 34. A robotic-based wireless RFID tag 12, 12' reading method 31D is considered semi-continuous monitoring with the frequency of monitoring set by the time interval between robotic-based surveys. The data is uploaded to cloud-based application 37 as described previously. In variations, the wheeled robot 34 is equipped with a roofing-membrane-voltage-application device 35 as depicted cross-sectionally in FIG. 4C to allow the specific location of a membrane defect to be isolated within the leak-detection area already provided by the wireless RFID tag 12 and 12'.

In most applications, reader data is uploaded directly to a cloud-based application 37 by the drone 30, handheld reader 31B, fixed reader 31C, and/or robotic reader 31D using an onboard 4G or 5G wireless cell connection. Alternatively, the reader data is relayed to another point where it can be uploaded to the cloud-based application 37. In many embodiments, the cloud-based application 37 is used to perform analysis on the data to generate trend charts, statistical process-control charts, and perform predictive analytics using applied statistics and artificial intelligence (AI) based machine learning algorithms that are used to predict whether a roofing installation may suffer a near-future leakage event. The cloud-based application 37 can also augment the database with weather conditions encountered by each roofing installation to help correlate the data obtained from the wireless RFID sensors (various embodiments) with actual weather conditions encountered to enhance prediction capabilities. The information from the cloud-application 37 are made available through a wireless application running on a smart phone 38 or another remote-computing device such as a tablet or computer. The cloud-based application 37 coupled with the RFID location technology effectively eliminates the need for the complex and structure-dedicated, permanently-installed, infrastructure needed for continuously-monitored on-demand ELD as described in the introduction of this writing. Furthermore, the cloud-based application 37 uses aggregate data from all roofing installations uploading data to improve the leak-prediction capabilities of the AI-based algorithms.

FIG. 4C depicts the roofing-membrane-voltage-application device 35 on the distal surface of single-ply roofing membrane 9 that has been installed over improved moisture-sensing roofing membrane 1, with its various layers: base membrane 2, base membrane metalized coating 3, wicking layer 4, sensing membrane 7, sensing-membrane metalized coating 3A and covering layer 5, and underlayment 8.

Roofing-membrane-voltage-application device 35 can be borne by a wheeled robot 34 with RFID reader 31D or by a person with a handheld RFID reader 31B. In such a scenario, the presence of a leak may have been previously detected by wireless RFID tag 12. Water W is depicted on the distal surface of the single-ply roofing membrane 9 with a membrane defect leakage path L. With the general location of the leakage isolated to an area monitored by wireless RFID tag 12, the roofing-membrane-voltage-application device 35 is used to impart a fixed direct-current (DC) voltage or time-varying alternating-current (AC) voltage to the distal surface of single-ply roofing membrane 9 in order to isolate the exact location of membrane penetration leakage path L within the general location of the leakage already reported by the wireless RFID tag 12. In many applications, this imparted voltage is between 20 volts and 40 volts DC or AC peak; however, the exact voltage level can vary. The external control of the applied voltage from device 35 (either person or robot 34) is typically in wireless communication with wireless RFID tag 12 while the method of leak-location isolation is performed. The applied voltage from device 35 capacitively couples to the metalized coating layers 3, 3A within the improved moisture-sensing roofing membrane 1:

- If there is no leakage path L present and no moisture within wicking layer 4, then the electrical potential of metalized coating layers 3, 3A is elevated via capacitive coupling to a similar voltage potential as that applied by roofing membrane voltage application device 35; therefore, no potential difference or very little potential difference exists between the sensing membrane 7 metalized coating 3A and the base membrane 2 metalized coating 3A, and this no-differential-voltage reading is reported by wireless RFID tag 12 to the RFID reader 31B (person) or 31D (robot 34) associated with roofing membrane voltage application device 35.
- On the other hand, if there is a leakage path L present and moisture within wicking layer 4, but roofing-membrane-voltage-application device 35 is not physically located over leakage path L, then the potential of metalized coating layers 3, 3A is pulled down to ground potential by the electrically conductive nature of the moisture within wicking layer 4, while the distal surface of roofing membrane 9 is held at the voltage potential applied by roofing-membrane-voltage-application device 35, and no potential difference or very little potential difference exists between the sensing membrane 7 metalized coating 3A and the base membrane 2 metalized coating 3A, and this no-differential-voltage reading is reported by wireless RFID tag 12 to the RFID reader 31B (person) or 31D (robot 34) associated with roofing membrane voltage application device 35.
- In the presence of leakage path L as discussed in the previous bullet, when the roofing-membrane-voltage-application device 35 physically passes over the area of leakage path L, the electrically conductive channel formed by leakage path L between the roofing-membrane-voltage-application device 35 and metalized coating layers 3, 3A imparts a voltage transient between metalized coating layers 3 and 3A that is reported by wireless RFID tag 12 to the RFID reader 31B (person) or 31D (robot 34) associated with roofing-membrane-voltage-application device 35. The voltage transient provides an exact location of leakage path L.

FIG. 4D depicts an embodiment for a method that uses a wheeled robot 34 to obtain RFID data from a roof 40 and the associated planned path 43 necessary to ensure complete reading coverage area 44. The radius of reading coverage area 44 is determined by the range at which the RFID reader 31D can read the data from wireless RFID tags (various embodiments). The overlap area 45 may be based on the circumscribed square area 48 within reading coverage area 44 when two reading coverage areas 44 are adjacent. This overlap area 45 can then set the distance between each path 43 as the wheeled robot travels back and forth across roof 40. Typically, the path 43 is programmed and learned by wheeled robot 34 using embedded reinforcement AI and/or may be augmented by collision-avoidance sensors onboard wheeled robot 34 (the most-advanced configuration), or path 43 is set using a guide wire/track adhered to the roof surface (the least-advanced configuration). The path can also be randomized so that wear patterns on the single-ply roofing membrane 9 do not appear over time. The path 43 can be pre-set to avoid obstacles 47 (such as a chimney) and 48 (such as a stairwell or air-conditioning unit). When the power level in the wheeled robot 34 drops to a prescribed level, the wheeled robot 34 returns automatically to a recharging station 41, which can be powered by structure power and/or a roof-mounted solar array. The wheeled robot 34 can upload acquired data directly to the cloud-based application 37, or that data can be relayed through a WiFi router 42 wired to the structure's internet connection. The wheeled robot 34 can be programmed to perform an entire set of rooftop readings at a predetermined interval, such as, for example, every night. Assuming a one-MPH travel speed for the wheeled robot 34, the rooftop-reading cycle would take a few minutes for a smaller roof (<25K SQF) or up to 15 minutes for a larger roof (>100K SQF). The wheeled robot 34 can also be configured to isolate the specific location of a membrane defect using the method discussed for FIG. 4C.

FIG. 4E depicts an embodiment for a method that can be used to perform a topographical mapping of a roofing installation. A roofing fragment is shown with several single-ply roofing membranes 9, with heat-welded seams 10 over several improved moisture-sensing roofing membranes 1A, as also depicted in FIG. 2A. Dashed line 60 shows an example of where one of the pluralities of sensing areas 7A/3A and one of the pluralities of wireless RFID tags 12 can be located under single-ply roofing membrane 9. Sensing area 7A/3A has dimensions of width $w_3$ and length $w_5$. For purposes of this example, it is assumed that $w_3=w_5=10$ feet and the area of sensing area 7A/3A is therefore 100 SQF. A wheeled cart 61 is used to locate each of the plurality of wireless RFID tags 12 that are located beneath the single-ply roofing membrane 9. The wheeled cart 61 is pushed using handle 64 along the center axis 60 of single-ply roofing membrane 9, since each of the plurality of wireless RFID tags 12 is installed along the longitudinal direction of single-ply roofing membrane 9 in the center of the membrane equally distant from the heat-welded seams 10 on either side.

Referring to the FIG. 4E detail, wheeled cart 61 has a frame 63 installed on low-durometer wheels 62 that supports RFID reader 31E and differential GPS device 33D. RFID reader 31E is set to a very low power such that it is only be able to read a wireless RFID tag 12 located immediately below the RFID reader 31E (a range of several inches at most). Furthermore, the frame 63 of wheeled cart 61 is made from an electrically conductive material such as aluminum or metalized plastic, which serves to block signal paths to other wireless RFID tags outside the perimeter of the wheeled cart 61. When RFID reader 31E detects a wireless RFID tag 12 directly below, differential GPS device 33D records the location with high precision. This precision is typically within 25 cm horizontally and 50 cm vertically using an internal antenna; an example of a surveyor-quality digital GPS or DGPS handheld device is the Trimble Geo 7X Handheld (see, e.g., https://geospatial.trimble.com/products-and-solutions/geo-7x). The unique digital ID, temperature, and moisture readings from wireless RFID tag 12, as captured by RFID reader 31E, and precise location information from differential GPS device 33D, including in some cases photos or video records, is either stored in the memory of differential GPS device 33D, or the data is uploaded to the cloud application 37. When all wireless RFID tag 12 within the roofing installation have been located, read, and mapped (tag's unique digital ID associated with precision differential GPS location), the topographical mapping of the roofing installation will have been completed. This topographical-mapping operation need only need to be performed once immediately after installation of the roof.

The data from each wireless RFID tag 12 allows the initial readings of the roofing installation to be normalized by referencing all future readings to this baseline (also referred to as a calibration tare). Any future readings that depart from the baseline will be obvious when tracked over time. An initial installation verification may then be performed, by dampening the roof with water and then reading all the wireless RFID tags 12 in the installation. Any wireless RFID tags 12 readings with departures from the baseline that are statistically significant, are flagged as Out-of-Family (OOF) and may warrant further investigation. Membrane defects can be precisely located within the flagged 100 SQF sensing area 7A/3A using the method described for FIG. 4C. If the installation passes the installation verification, then the roof is ready to be placed in service with either continuous or semi-continuous monitoring using the methods described previously for FIG. 4B.

For reference, given a 100-SQF sensing area 7A/3A for each wireless RFID tag 12, a 25,000-SQF roof will have 250 wireless RFID tags 12, while a 50,000-SQF roof will have 500 wireless RFID tags 12, and a 100,000-SQF roof will have 1,000 wireless RFID tags 12, and so forth. It may be beneficial to have the topographical mapping of a roofing installation performed automatically with a wheeled robot 34. Alternatively, it the topographical mapping can be performed using a flying drone 30.

FIG. 4F depicts an embodiment for a method that reads the wireless RFID tags (various embodiments) within improved moisture-sensing roofing membrane 1 using an RFID reader 31F fixedly located under a sloped wooden (or other non-conductive material) roofing substrate 13B for a roof 50 installed on structure 13B/13C. It should be noted that obtaining RFID readings directly through a structure 13B/13C is generally only possible when the structural materials are non-electrically conductive, such as in the case of wood or plastic. Additionally, the roof 50 should be of a configuration that uses minimal mechanical fasteners to attach the roof 50 to substrate 13B such that the roof 50 sections can be aligned with safe-to-fasten areas 6B2 and 6C, as depicted in FIG. 2A. Such a roof 50 may be a metal roof for residential structures, so long as the RFID readings are taken from within the structure and the substrate is non-conductive.

For purposes of further discussion related to FIGS. 5A through 5I, the methods for reading-out the data using RFID described previously in this application and will be referred to as "RFID data readout," or as "data readout," or as "moisture/leakage data readings," or just as "readings."

Referring to the method flowchart of FIG. 5A, the installation-topography-mapping method consists of three basic functions/steps:

(1) Readout data all RFID sensor tags;
(2) Associate the location of each RFID sensor tag with the physical location of that tag within the installation; and
(3) Normalize the dry readings of all the RFID sensor tags by using a calibration tare.

The installation-topography-mapping method is necessary to identify the physical location of every RFID sensor tag within the building-envelope-protection-system installation and establish the dry baseline reading of the system. The installation-topography-mapping process begins 101 after the building-envelope-protection system with intrinsic moisture-sensing capability has been installed on a structure. Each time an RFID data readout 102 is made, the following algorithm is executed:

IF the associated panel or membrane transponder (TID) barcode is visible 104,
THEN (YES) associate the visible TID barcode 27 marking and with the actual RFID data readout TID;
ELSE (NO) 103 use an alternate tag location method.

The alternate tag location method 103 uses an extremely low RFID reader Effective Isotropic Radiated Power (ERIP) or an attached metalized-directional-reading shield, so that only the closest tag may be read:

IF differential GPS is available 105,
THEN (YES) read the differential GPS location coordinate 107 and write the differential GPS location coordinates 108 to the non-volatile memory of the RFID tag;
ELSE (NO), write the visual or directional coordinates 106 to the non-volatile memory of the RFID tag.

Optionally, even when differential GPS location coordinates 108 are available, the visual or directional coordinates 106 can also be written to the non-volatile memory of the RFID tag. The visual or directional coordinates 103 can consist of locating the position of an RFID tag within the installation using a camera or laser rangefinder to determine the distance and angular bearing from pre-surveyed physical datums (FIG. 2J, Items 95 and 95A) and/or using a camera to determine the location within a pre-plotted physical grid marked upon the installation. FIG. 4G provides more detail of the visual-coordinate system. The RFID tag moisture and temperature reading 110 is made after the transponder ID (TID) and tag location have been established.

FIG. 4G depicts a schema for creating a visual and direction coordinate system for an installed building-envelope-protection system, which is encompassed by the rectangle between datums 95B, 95C, 95D, and 95E, which in turn could represent the four corners of the physical structure for the installed building-envelope-protection system. For example, the installation can be a roofing or decking as depicted notionally in FIG. 2J. The installation in this example has been divided horizontally into 18 zones labeled 'A' through 'R', and vertically into 12 zones labeled '1' to '12'. Using an exceptionally low RFID reader ERIP or a metalized directional-reading shield so that only the closest tag may be read, the physical location of the RFID tag within the installation can be identified visually by the intersection of the horizontal and vertical zones, which are pre-marked on the structure. In the example shown in FIG. 4G, the intersection of the zone would be 'F4'. Although the zone sizes can vary depending on the installation, the zones for a roofing installation are typically 10-feet in length such that each zone intersection represents an area of 100 SQF. Directional information can also be used to determine the physical location of the tag within the installation. A compass reading can be used along with the directional line-of-sight to each datum (diagonal lines between example location 'F4') and datums 95B, 95C, 95D, and 95E. Depending on the distances and obstructions along the line-of-sight, the installation may require further division into several coordinate areas each with a set of associated datum (not shown), and several different sightings may be necessary. Laser-ranging can be also used to augment camera sightings, and enhancements such as reflectors or barcode markers can be used as the visual markers for the coordinate systems. A LIDAR device can also be used to establish location within the coordinate system.

As the RFID readings continue to be taken, the data for each RFID tag is checked 111 for an Out-of-Family (OOF) reading when compared to all the other RFID tags read.

IF (YES) tag reading is OOF,
THEN begin a diagnostic routine 112 to determine the problem.

Refer to the FIG. 5C plot where readings for 10 hypothetical RFID tags have been made. Hypothetical RFID Tag 7 is exhibiting a higher reading (111 YES) that has been flagged as OOF (i.e., above the dashed line at reading level '58'). The OOF determination can be performed using applied industrial statistics such as statistical-process control (SPC) or by simple normal distribution mean and standard deviation metrics to establish the upper and lower control limits beyond which a reading may be considered OOF. The statistical confidence in the OOF control limits will increase with larger numbers of readings; therefore, the final OOF determination may be held until a large majority of sensor RFID tags within an installation have been read (this will be determined by the size and number of sensor tags). Additionally, if multiple installations have already been made at the time of the installation topography, then historical data can provide guidance for establishing the range of expected initial rag readings and therefore establishment of OOF control limits. The OOF reading (111 YES) may be due to a damaged tag (e.g., a mechanical fastener was driven through the tag) or another installation error. It may also be determined that correcting a bad tag reading may not be a cost-effective solution (i.e., ripping up the installation to replace the bad tag), in which case the faulty tag may be left in place and the bad reading marked within the installation. The plot in FIG. 5D depicts when the OOF reading for hypothetical Tag 7 has been corrected (111 NO), and all hypothetical tag readings lie within the upper (<reading level '58') and lower (>reading level '59') control limits. It should be noted that because of the low-cost nature of the RFID sensor tags (typically <$1 USD), and depending on the installation, it may be beneficial to install several sensor tags at each location to provide an average reading that will tolerate the loss of one tag.

IF the reading anomaly 113 has been resolved (or addressed),
THEN (YES) send all the tag information 114 to the cloud application database;
ELSE (NO) continue diagnostics 112 routines.
IF all tags in an installation have been read and location mapped 116,
THEN (YES) the topographical mapping is complete 118;
ELSE (NO) continue 117 to read 102 more tags.

FIG. 5E depicts the final adjustment made in the cloud application database when the topographical mapping has been completed 118. The baseline readings 118A for ten hypothetical tags is used to perform a calibration tare 118B to produce the normalized topographical mapping baseline 118C for an installation under dry conditions (where 118C=118A-118B). Any reading departures from this baseline for any of the ten installed hypothetical tags indicates a situation where moisture has infiltrated into the installation.

FIG. 5F depicts a plot of a method that can be used to perform a verification of a building-envelope-protection installation with intrinsic moisture-sensing capability. The moisture-sensing installations for such a method would be as described in FIGS. 1A through 2J.

The installation-verification method depicted in the flowchart of FIG. 5B consists of two basic functions/steps:
(1) Readout test data all RFID sensor tags with water placed on/over installation membranes/panels; and
(2) Determine if any RFID sensor tag readings are OOF.

The installation-verification method is used to determine if a building-envelope-protection system is performing adequately under a water loading and/or wetted test conditions prior to being placed in service.

The installation-verification process begins 200 after the building-envelope-protection system with intrinsic moisture-sensing capability has been installed on a structure and only after the installation-topography-mapping method of FIGS. 5A and 4G has been completed. The verification begins 201 by wetting the membrane or panels on all or part of an installation 202. After wetting, the RFID data readouts 203 are made and compared to the baseline readings 118C from the topological mapping 204:

IF an RFID sensor reading 205 is OOF,
THEN (YES) enter installation problem routines 206 to locate the leak or moisture-infiltration point (see FIG. 8A);
ELSE (NO) send the installation verification data 208 along with the date and time to the cloud application 115b; the installation verification has passed and is completed 209.

FIG. 5F depicts a plot of 10 hypothetical sensor readings made 205A during installation verification with hypothetical Tag 5 indicating an OOF reading 206A, which is reading '+6' above the upper control limit that is set at '+5'. The upper and lower control limits may initially be based on the dry readings but can be expanded based on historical data. SPC and other statistical methods can be used to help establish the control limits. The cloud-based application can be used to calculate and establish the preliminary control limits used for installation-verification checks. Additionally, as many installations have been made and verified, the control limits may be adjusted based on expected normal sensor-tag-reading behavior under installation verification conditions for each type of installation. As an example, the drainage plane of an EIFS installation can be expected to allow moisture to enter under wetted conditions, but the drainage plane will then dry out over time. Therefore, EIFS panel moisture readings may be dynamic in nature, with moisture readings that fluctuate with time, and departures from the expected dynamic behavior constitutes an OOF condition. On the other hand, roofing and other membrane installations typically can be expected to be dry with little or no departures from the baseline; therefore, the control limits for OOF conditions for those installations may be tighter.

FIG. 5G depicts a plot of 10 hypothetical sensor readings made after corrective action has been taken to locate and repair 207 the offending membrane or panel 208A during installation verification with hypothetical sensor Tag 5 not indicating a normal or in-family reading 208B, which is reading '-1.5' above the lower control limit that is set to '-5'.

FIG. 5H depicts example readings 303 made over time of hypothetical sensor Tag 3 from the FIG. 5G plot 208A within a building-envelope-protection system with intrinsic moisture-sensing capability that has been placed in service. The readings have been made every week for this hypothetical installation and they fluctuate randomly between '+2' and '−2' over time from reading-to-reading, but all readings are well within upper and lower statistical control limits (hypothetically set to '+5' and '−5' for this example). This constitutes an installation sensor tag with healthy moisture readings.

FIG. 5I depicts a plot of example readings 304 made over time of hypothetical sensor Tag 4 from the FIG. 5G plot 208A within a building-envelope-protection system, with intrinsic moisture-sensing capability that has been placed in service. The readings have been made every week for this hypothetical installation and they fluctuate randomly between '+2' and '−2' over time from reading-to-reading. All readings are well within upper and lower statistical control limits (hypothetically set to '+5' and '−5' for this example) up to around mid-November, where a reading 304B for sensor Tag 4 suddenly reaches '+5'. Closer examination of sensor Tag 4 readings reveals that the readings began an upward trend 304A in September. This trending pattern is also statistically OOF from the string of random readings that went before and would be flagged as such using standard SPC techniques. By identifying OOF behavior well in advance of an actual gross failure in the building envelope (in this hypothetical example, a full two months before the reading that exceeded the upper control limit), problems may be addressed before structural damage occurs and toxic mold has a chance to form. In an actual installation, all sensor tag readings are simultaneously tracked and continuously compared to the baseline. As more data becomes available from increasing numbers of installations, patterns in the data that lead to actual envelope protection system failures can be recognized. These failure patterns can be taught to machine-learning routines or the patterns can be shown to AI deep-learning routines to provide advanced analytical diagnostics capabilities. The cloud-based application can employ SPC or statistical models, or advanced AI-based analytical diagnostic routines, to automatically identify and alert stakeholders to problems in a building-envelope-protection system.

V. Alternative Embodiments and Other Variations

The various embodiments and variations thereof described herein, including the descriptions in any appended Claims and/or illustrated in the accompanying Figures, are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and Claims herein.

What is claimed is:

1. An improved moisture-sensing membrane for use with roofing systems, comprising:
   a base membrane comprised of a high-temperature-rated polymer with a conductive-metalized coating disposed on top of said base membrane, wherein:
      said conductive-metalized coating has a surface resistivity of less than or equal to 5 ohms/square, and
      the bottom surface of said base membrane is considered the "proximal surface" of the improved moisture-sensing membrane;
   one or more moisture-sensing areas located and distributed above said base membrane, wherein:
      each moisture-sensing area is comprised of a coupling of conductive-metalized coating and a layer of high-temperature-rated polymer,
      each moisture-sensing area has at least one moisture-sensing element attached to the proximal surface of said moisture-sensing area, wherein said at least one moisture-sensing element is co-located with a self-powered, passive RFID tag;
      said conductive-metalized coating has a surface resistivity of less than or equal to 5 ohms/square, and
      each of said moisture-sensing area's layer of high-temperature-rated polymer is disposed nearest said base membrane, as compared to said moisture-sensing area's conductive-metalized coating;
   a wicking layer disposed between said base membrane and said one or more moisture-sensing areas, wherein:
      said wicking layer is substantially comprised of high-temperature hydrophilic porous membrane material, and
      said wicking layer is in communication with both said base membrane and said one or more sensing areas; and
   a covering membrane disposed on said one or more moisture-sensing areas, wherein:
      said covering membrane is substantially comprised of high-temperature polymer or fluoropolymer materials,
      the surface of said covering membrane that is not in contact with said one of more moisture-sensing areas is considered the "distal surface" of said improved moisture-sensing membrane, and
      said covering membrane has a plurality of openings to allow moisture that is present on the distal surface of the improved moisture-sensing membrane to enter said wicking layer in order to facilitate moisture detection;
   wherein said improved moisture-sensing membrane is adapted to be installed in a roofing system with the distal surface of said improved moisture-sensing membrane in close proximity to or in direct contact with a roofing system's single-ply membrane in order to detect leaks in said roof's single-ply membrane.

2. The improved moisture-sensing membrane of claim 1, wherein said at least one moisture-sensing element in each moisture-sensing area is adapted to measure coplanar capacitance for moisture data measurements.

3. The improved moisture-sensing membrane of claim 2, wherein said at least one moisture-sensing element in each moisture-sensing area is adapted to measure biplanar capacitance for both data measurements for moisture and roof loading.

4. The improved moisture-sensing membrane of claim 1, further comprising a plurality of stenciled or printed safe-to-fasten visual keep-away areas disposed on the distal surface of said covering membrane, wherein said plurality of stenciled or printed safe-to-fasten visual keep-away areas are spatially aligned with said plurality of moisture-sensing elements such that persons installing said improved moisture-sensing membrane on a structure are provided visual indications of the locations of said plurality of moisture-sensing elements to avoid damaging any of said plurality of moisture-sensing elements.

5. The improved moisture-sensing roofing membrane of claim 1, further comprising a plurality of barcodes disposed on the distal surface of said improved moisture-sensing roofing membrane, wherein:
- each barcode is co-located with at least one of said plurality of moisture-sensing elements;
- each barcode encodes a unique ID of a corresponding moisture-sensing element of said plurality of moisture-sensing elements; and
- said plurality of barcodes facilitates the roofing-installation topographical mapping of said plurality of moisture-sensing elements to aid in the locating of leaks.

6. A method to detect and process moisture-detection signals within a roofing structure, said roofing structure comprising an improved moisture-sensing membrane according to claim 1, comprising the steps of:
- installing a roofing structure that comprises at least one improved moisture-sensing membrane according to either claim 1;
- using an RFID reader, mapping the locations of each moisture-sensing element contained in said at least one improved moisture-sensing membrane;
- wirelessly transferring RFID reader data to and from each moisture-sensing element contained in said at least one improved moisture-sensing membrane;
- remotely collecting and storing baseline data from said moisture-sensing elements contained in said at least one improved moisture-sensing membrane;
- using an RFID reader, detecting moisture infiltration into said roofing structure by reading the RFID tags for said moisture-sensing elements contained in said at least one improved moisture-sensing membrane;
- using an RFID reader, determining the location of the moisture infiltration into said roofing structure by reading data from the RFID tags for said moisture-sensing elements contained in said at least one improved moisture-sensing membrane;
- wirelessly transferring RFID reader data to and from each moisture-sensing element contained in said at least one improved moisture-sensing membrane; and
- remotely collecting and storing data from said moisture-sensing elements contained in said at least one improved moisture-sensing membrane.

7. The method of claim 6, wherein the mapping step uses a GPS device in conjunction with said RFID reader to map the locations of each moisture-sensing element contained in said at least one improved moisture-sensing membrane.

8. The method of claim 6, wherein the step for determining the location of moisture infiltration uses a GPS device in conjunction with said RFID reader.

9. The method of claim 6, further comprising the steps of:
- using statistical methods to determine when moisture readings become out-of-family (OOF);
- using predictive analytics for at least one improved moisture-sensing membrane for said roofing structure; and
- using encryption to protect both said transferred and stored data gathered from said envelope-protection system of said building or structure.

10. The method of claim 6, further comprising the step of establishing a safe-to-fasten visual keep-away zone or visual markers on the surface of said at least one improved moisture-sensing membrane in order to prevent damage said each moisture-sensing elements contained in said at least one improved moisture-sensing membrane during the installation of said roofing structure.

11. The method of claim 6, wherein said RFID-tag readings are accomplished by a remotely-controlled or autonomous flying drone that can fly within the RFID tags' range to make readings.

12. The method of claim 6, wherein said RFID-tag readings are accomplished by a remotely-controlled or autonomous wheeled robot that is preprogrammed to traverse the top of said roofing structure the RFID tags' range to make readings.

13. The method of claim 6, wherein said moisture-sensing elements contained in said at least one improved moisture-sensing membrane use electrical impedance within a sensor-detection element or elements to sense the presence of moisture by measuring one or more of the following:
- biplanar capacitance;
- electrical resistance;
- both biplanar capacitance and electrical resistance; and/or
- changes in the antenna RLC impedance of the RFID-enabled sensor itself.

14. The method of claim 13, wherein said biplanar capacitance measurements are used to measure the loading on said roofing structure.

15. An improved moisture-sensing roofing membrane adapted to be installed on a hard roofing substrate, comprising:
- a moisture-impervious barrier membrane base membrane, having a proximal surface adapted for being in contact with said hard roofing substrate, wherein the opposite surface is considered the "distal surface;"
- a plurality of moisture-sensing elements attached to the proximal surface of said moisture-impervious barrier membrane, wherein each of said plurality of moisture-sensing elements is associated with a co-located, self-powered, passive RFID tag that is installed in said improved moisture-sensing roofing membrane; and
- a moisture-wicking-fabric layer covering said plurality of moisture-sensing elements.

16. The improved moisture-sensing roofing membrane of claim 15, wherein said RFID tags are disposed on the distal surface of said improved moisture-sensing roofing membrane.

17. The improved moisture-sensing roofing membrane of claim 15, further comprising a plurality of stenciled or printed safe-to-fasten visual keep-away areas disposed on the distal surface of said improved moisture-sensing roofing membrane, wherein said plurality of stenciled or printed safe-to-fasten visual keep-away areas are spatially aligned with said plurality of moisture-sensing elements such that persons installing said improved moisture-sensing roofing membrane on a roofing structure are provided visual indications of the locations of said plurality of moisture-sensing elements to avoid damaging any of said plurality of moisture-sensing elements.

18. The improved moisture-sensing roofing membrane of claim 15, further comprising a plurality of barcodes disposed on the distal surface of said improved moisture-sensing roofing membrane, wherein:
- each barcode is co-located with at least one of said plurality of moisture-sensing elements;
- each barcode encodes a unique ID of a corresponding moisture-sensing element of said plurality of moisture-sensing elements; and
- said plurality of barcodes facilitates the roofing-installation topographical mapping of said plurality of moisture-sensing elements to aid in the locating of leaks.

19. The improved moisture-sensing roofing membrane of claim 15, wherein said at least one moisture-sensing element in each moisture-sensing area is adapted to measure coplanar capacitance for moisture data measurements.

20. The improved moisture-sensing roofing membrane of claim 15, wherein said at least one moisture-sensing element in each moisture-sensing area is adapted to measure biplanar capacitance for both data measurements for moisture and roof loading.

21. A method to detect and process moisture-detection signals within a roofing structure, said roofing structure comprising an improved moisture-sensing membrane according to claim 15, comprising the steps of:
- installing a roofing structure that comprises at least one improved moisture-sensing membrane according to claim 15;
- using an RFID reader, mapping the locations of each moisture-sensing element contained in said at least one improved moisture-sensing membrane;
- wirelessly transferring RFID reader data to and from each moisture-sensing element contained in said at least one improved moisture-sensing membrane;
- remotely collecting and storing baseline data from said moisture-sensing elements contained in said at least one improved moisture-sensing membrane;
- using an RFID reader, detecting moisture infiltration into said roofing structure by reading the RFID tags for said moisture-sensing elements contained in said at least one improved moisture-sensing membrane;
- using an RFID reader, determining the location of the moisture infiltration into said roofing structure by reading data from the RFID tags for said moisture-sensing elements contained in said at least one improved moisture-sensing membrane;
- wirelessly transferring RFID reader data to and from each moisture-sensing element contained in said at least one improved moisture-sensing membrane; and
- remotely collecting and storing data from said moisture-sensing elements contained in said at least one improved moisture-sensing membrane.

22. The method of claim 21, wherein the mapping step uses a GPS device in conjunction with said RFID reader to map the locations of each moisture-sensing element contained in said at least one improved moisture-sensing membrane.

23. The method of claim 21, wherein the step for determining the location of moisture infiltration uses a GPS device in conjunction with said RFID reader.

24. The method of claim 21, further comprising the steps of:
- using statistical methods to determine when moisture readings become out-of-family (OOF);
- using predictive analytics for at least one improved moisture-sensing membrane for said roofing structure; and
- using encryption to protect both said transferred and stored data gathered from said envelope-protection system of said building or structure.

25. The method of claim 21, further comprising the step of establishing a safe-to-fasten visual keep-away zone or visual markers on the surface of said at least one improved moisture-sensing membrane in order to prevent damage said each moisture-sensing elements contained in said at least one improved moisture-sensing membrane during the installation of said roofing structure.

26. The method of claim 21, wherein said RFID-tag readings are accomplished by a remotely-controlled or autonomous flying drone that can fly within the RFID tags' range to make readings.

27. The method of claim 21, wherein said RFID-tag readings are accomplished by a remotely-controlled or autonomous wheeled robot that is preprogrammed to traverse the top of said roofing structure the RFID tags' range to make readings.

28. The method of claim 21, wherein said moisture-sensing elements contained in said at least one improved moisture-sensing membrane use electrical impedance within a sensor-detection element or elements to sense the presence of moisture by measuring one or more of the following:
- biplanar capacitance;
- electrical resistance;
- both biplanar capacitance and electrical resistance; and/or
- changes in the antenna RLC impedance of the RFID-enabled sensor itself.

29. The method of claim 28, wherein said biplanar capacitance measurements are used to measure the loading on said roofing structure.

* * * * *